US008657890B2

(12) United States Patent
Ng et al.

(10) Patent No.: US 8,657,890 B2
(45) Date of Patent: Feb. 25, 2014

(54) EFFECT OF NATURAL AND SYNTHETIC ANTIOXIDANTS ON THE OXIDATIVE STABILITY OF BIODIESEL

(75) Inventors: K.Y. Simon Ng, West Bloomfield, MI (US); Haiying Tang, Detroit, MI (US); Steven O. Salley, Grosse Pointe Park, MI (US)

(73) Assignee: Wayne State University, Detroit, MI (US)

( * ) Notice: Subject to any disclaimer, the term of this patent is extended or adjusted under 35 U.S.C. 154(b) by 229 days.

(21) Appl. No.: 12/919,928

(22) PCT Filed: Feb. 26, 2009

(86) PCT No.: PCT/US2009/035226
§ 371 (c)(1),
(2), (4) Date: Nov. 29, 2010

(87) PCT Pub. No.: WO2009/108747
PCT Pub. Date: Sep. 3, 2009

(65) Prior Publication Data
US 2011/0067294 A1    Mar. 24, 2011

Related U.S. Application Data

(60) Provisional application No. 61/031,819, filed on Feb. 27, 2008.

(51) Int. Cl.
*C10L 1/18* (2006.01)

(52) U.S. Cl.
USPC .................................. 44/308; 44/388; 44/450

(58) Field of Classification Search
USPC ............................................ 44/308, 388, 450
See application file for complete search history.

(56) References Cited

U.S. PATENT DOCUMENTS

| 4,895,703 | A | 1/1990 | Zupanovich et al. |
| 7,964,002 | B2 * | 6/2011 | DeBlase et al. ................. 44/412 |

FOREIGN PATENT DOCUMENTS

| CN | 101 029 257 | | 9/2007 |
| EP | 1 736 528 | | 12/2006 |
| GB | 682 205 | | 11/1952 |
| GB | 2169611 | * | 7/1986 |
| WO | WO90/00015 | | 1/1990 |
| WO | WO2007/062304 | | 5/2007 |
| WO | WO2007/102948 | | 9/2007 |
| WO | WO2007/145738 | | 12/2007 |

OTHER PUBLICATIONS

Hess et al., "Effect of Antioxidant addition on NOx emissions from biodiesel", *Energy & Fuels*, vol. 19(4), Jul. 2005, pp. 1749-1754.

* cited by examiner

*Primary Examiner* — Cephia D Toomer
(74) *Attorney, Agent, or Firm* — Brinks Gilson & Lione

(57) ABSTRACT

Disclosed are biodiesel fuels with improved oxidative stability. Disclosed are biodiesel fuels which comprise two or more antioxidants which increase the oxidative stability of the biodiesel fuel.

22 Claims, 15 Drawing Sheets

Heterodimer

8,657,890 B2

EFFECT OF NATURAL AND SYNTHETIC ANTIOXIDANTS ON THE OXIDATIVE STABILITY OF BIODIESEL

The present application claims priority to U.S. Provisional Patent application No. 60/031,819, field Feb. 27, 2008, the entirety of which is hereby incorporated by reference.

FIELD OF THE INVENTION

The present invention relates to biodiesel fuels with increased oxidative stability.

BACKGROUND OF THE INVENTION

Biodiesel, which is derived from vegetable oils or animal fats through transesterification to produce mono-alkyl esters, exhibits fuel properties comparable with conventional petroleum diesel. Biodiesel provides enhanced lubricity properties and produces low exhaust emissions, such as particulate matter, polycyclic aromatic hydrocarbons, carbon dioxide, sulfur dioxide and smoke. However, a significant problem associated with the commercial acceptance of biodiesel is poor oxidative stability.

The presence of high levels of unsaturated fatty acid methyl esters (FAME) makes biodiesel very susceptible to oxidation as compared to petroleum diesel. Oxidative processes bring about increased viscosity as a result of condensation reactions involving double bonds, also leading to the formation of insolubles, which can potentially plug fuel filters and injection systems. The increased acidity and increased peroxide value as a result of oxidation reactions can also cause the corrosion of fuel system components, hardening of rubber components, and fusion of moving components. ASTM D6751-07 includes an oxidation stability standard of a 3 hour minimum induction period (IP) as measured using the Rancimat test (EN14112). The European Committee for standardization adopted a 6 hour minimum IP as the specification. A survey of retail biodiesel samples performed in 2004 indicated that only 4 out of 27 B100 samples met the oxidative stability standard of 3 hour and over 85% had an IP less than 2 hours. In a 2006 survey report, the range of induction periods in 10 samples was 0.43 to 4.26 hours, and only 3 out of 10 B100 samples met the standard. Our survey of B20, B10, and B5 samples from retail stations also found that over 50% had an IP less than 6 hours, the proposed ASTM oxidative stability for B6-B20.

Factors which influence the oxidative stability of biodiesel include fatty acid composition, natural antioxidant content, the level of total glycerin, and the conditions of fuel storage such as temperature, exposure to light and air, and material of tank construction. Previous studies have found that antioxidants can be effective in increasing the stability of biodiesel. However, these effects have not been fully elucidated and results have been inconclusive or conflicting. Butylated hydroxyanisole (BHA) and butyl-4-hydroxytoluene (BHT) have been shown to have nearly the same effect on the oxidative stability of rapeseed oil- and tallow-based biodiesel, and the optimal level of synthetic antioxidants was determined to be 400 ppm. It has been reported that pyrogallol (PY), propylgallate (PG), and t-butylhydroquinone (TBHQ) could significantly improve the stability of biodiesel obtained from rapeseed oil, used frying oil, and beef tallow, whereas BHT was not very effective. Moreover, it has been found that BHT had the highest effectiveness for refined soybean oil-based biodiesel, while BHA displayed little effectiveness.

The major feedstock for biodiesel production is rapeseed oil in Europe, while soybean oil is the major feedstock in the USA. Biodiesel made from soybean oil has a significantly higher content of methyl linoleate (C18:2) and methyl linolenate (C18:3) than that made from rapeseed oil, and therefore soy-based biodiesel demonstrates noticeably poorer oxidative stability. Moreover, in a stability study of biodiesel and biodiesel blends, long-term storage of biodiesel was recognized as an important issue. Although the BIOSTAB project conducted in Europe focused on the long-term stability of rapeseed-based biodiesel at room temperature, and outside ambient temperature for up to 24 months, few studies have evaluated soy-based biodiesel.

A few studies have revealed that antioxidants improve the oxidative stability of biodiesel, and reports have been made about the synergism of antioxidants in edible oils and fats and in lubricating oils, however the synergy of synthetic antioxidants in biodiesel has not been fully elucidated.

Because commercial acceptance of biodiesel has been limited by poor oxidative stability there is need develop new biodiesel formulations having increased oxidative stability for commercial use.

BRIEF SUMMARY OF THE INVENTION

One embodiment according to the disclosure is a biodiesel fuel which comprises a blend of at least two antioxidants. Another embodiment is where the biodiesel fuel has at least one improved characteristic selected from the group consisting of: reduced acid potential as measured by total acid number; increased induction period; and increased stability factor as compared with the biodiesel fuel absent the antioxidant. Another embodiment is a biodiesel fuel comprising a blend of at least two antioxidants having an induction period of greater than 3 hours. Another embodiment is a biodiesel fuel comprising a blend of two antioxidants wherein the two antioxidants are: tert-butyl hydroquinone and pyrogallol; tert-butyl hydroquinone and propyl gallate; or tert-butyl hydroquinone and butylated hydroxyl anisole.

BRIEF DESCRIPTION OF THE DRAWINGS

FIG. 9 (b) is a graph of the resultant IP values of using binary antioxidant blends at 1000 ppm loading: in DPF.

FIG. 10 (b) illustrates a potential mechanism for the synergistic interaction between TBHQ and PY via antioxidant heterodimer formation.

DETAILED DESCRIPTION OF THE INVENTION

Figure 1:
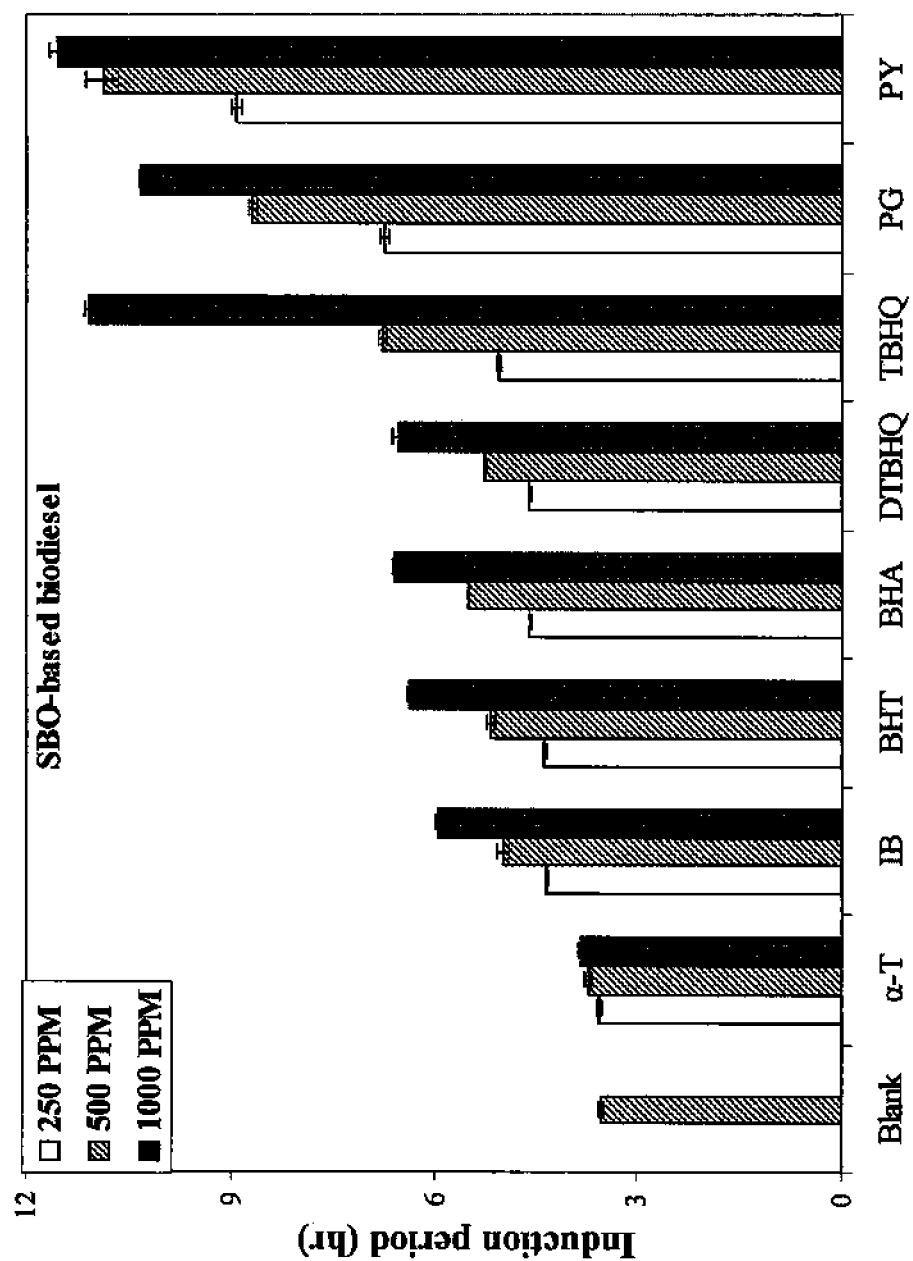
FIG. 1 shows the effects of concentration of α-T, IB, BHT, BHA, DTBHQ, TBHQ, PG, and PY on the induction period of soybean oil (SBO-) based biodiesel.

An embodiment of the present invention is a biodiesel fuel comprising a blend of at least two antioxidants. The antioxidants can be any antioxidant suitable for increasing the oxidative stability of a biodiesel fuel. Depending on the desired characteristics of the biodiesel, one skilled in the art would be able to select appropriate antioxidants based on their knowledge in conjunction with the present disclosure. Suitable antioxidants include, but are not limited to, butylated hydroxytoluene (BHT), butylated hydroxyanisole (BHA), propyl gallate (PG), pyrogallol (PY), tert-butyl hydroquinone 2,5-ditert-butyl-hydroquinone (TBHQ) or a tocopherol.

Another embodiment is a biodiesel fuel comprising at least two antioxidants where the biodiesel fuel has a reduced acid potential as measured by total acid number (TAN) as compared with the biodiesel fuel absent the antioxidant, or an increased induction period as compared with the biodiesel fuel absent the antioxidant, or an increased stability factor as compared with the biodiesel fuel absent the antioxidant. Depending on the desired characteristics of the biodiesel, one skilled in the art, in view of the present disclosure, would be able to select an appropriate method of evaluating the oxidative stability of the biofuel. Another embodiment is a biodiesel fuel comprising at least two antioxidants where the induction period is greater than about 3 hours, or between about 3 hours and about 100 hours or between about 5 hours and about 50 hours or between about 10 hours and about 50 hours.

Another embodiment is where the antioxidants are butylated hydroxytoluene, butylated hydroxyanisole, propyl gallate, pyrogallol, tert-butyl hydroquinone, 2,5-ditert-butyl-hydroquinone or α tocopherol. In another embodiment the biodiesel fuel comprises a blend of tert-butyl hydroquinone and pyrogallol or a blend of tert-butyl hydroquinone and propyl gallate or a blend of tert-butyl hydroquinone and butylated hydroxyl anisole.

In another embodiment the feedstock for the biodiesel fuel is a vegetable oil or an animal fat or any mixture of a vegetable oil and an animal fat. In some embodiments the feedstock for the biodiesel fuel is soybean oil, cottonseed oil, rapeseed oil, corn oil, palm oil, yellow grease, poultry fat, choice white grease or any mixture thereof. While the characteristics of biofuels from different feedstocks may vary, for example by the FAME compositions, one skilled in the art, in view of the present disclosure would be able to select appropriate antioxidants and concentrations of antioxidants to achieve a biofuel with the desired characteristics.

In yet another embodiment the concentration of each antioxidant in the biodiesel fuel is from about 20 to about 5,000 ppm, or from about 50 to about 5000, or from about 50 to about 2000, or from about 200 to about 2000 or from about 200 to about 1000 or from about 500 to about 1000 or from about 300 to about 700. In certain embodiments the total concentration of antioxidants in the biofuel is about 1000 ppm. In a particular embodiment the biodiesel fuel comprises tert-butyl hydroquinone at a concentration of about 700 ppm and pyrogallol at a concentration of about 300 ppm.

In another embodiment the two antioxidants are at a weight ratio of about 1:1 or about 1:2 or about 1:3 or about 1:4 or about 1:5 or about 1:6 or about 1:7 or about 1:8 or about 1:9. In a preferred embodiment the two antioxidants are at a weight ratio of about 2:1. In another embodiment the two oxidants are tert-butyl hydroquinone and pyrogallol at a weight ratio of about 2:1. Depending on the desired characteristics of the biodiesel, one skilled in the art, in view of the present disclosure, would be able to select appropriate concentrations and ratios of antioxidants.

Abbreviations

α-T (α-tocopherol), BHA (butylated jydroxyanisole), BHT (butylated hydroxytoluene), TBHQ (t-butylhydroquinone), DTBHQ (2,5-Di-tert-butyl-hydroquinone), IB (ional BF200), PG (propylgallate), PY (pyrogallol), SBO (soybean oil), CSO (cottonseed oil), PO (palm oil), PF (poultry fat), YG (yellow grease), CWG (choice white grease), ULSD (#2 ultra low sulfur diesel), DSBO (distilled soybean oil), DPF (distilled poultry fat), FAME (fatty acid methyl esters), TAN (Total acid number).

Materials

Fresh SBO-biodiesel was obtained from NextDiesel (Adrian, Mich., USA) or from Biodiesel Industries (Denton, Tex.). CSO-, PF-, and YG-based biodiesel, were obtained from Biodiesel Industries (Denton, Tex.). Certification #2 ultra low sulfur diesel (ULSD) was obtained from Halternann Products (Channelview, Tex.). Distilled soybean oil (DSBO) and distilled poultry fat (DPF) biodiesels using a Koehler (Bohemia, N.Y., USA) K80200 vacuum distillation apparatus. The blends were made on a volume basis and stored in glass bottles at room temperature. Biodiesel was used as B100 or in a blend with petroleum diesel. A blend of 20% biodiesel with 80% ULSD, by volume, is termed: "B20".

The α-tocopherol (α-T), butylated hydroxyanisole (BHA, 98.5%), butyl-4-methylphenol (BHT), 2,5-Di-tert-butyl-hydroquinone (DTBHQ, 99%), propylgallate (PG), t-butylhydroquinone (TBHQ, 97%), and pyrogallol (PY, 99%) were purchased from Sigma-Aldrich Inc. (St. Louis, Mo.). Ionol BF200 (IB) was obtained from Degussa Sant Celoni (Barcelona, Spain). Up to 1000 ppm of antioxidants was found to dissolve in the biodiesel samples.

Determination of Fatty Acid Composition

The fatty acid composition of each biodiesel was determined using a Perkin-Elmer Clarus 500 GC-MS with a split automatic injector, and a Rtx-WAX (Restek, Bellefonte, Pa.) column (length: 60 meters; ID: 0.25 mm, coating: 0.25 μm).

Determination of Oxidative Stability

The oxidative stability of B100 biodiesel samples was determined using a Metrohm 743 Rancimat (Herisau, Switzerland) per the EN14112 method. In this test, a 10 L/hour stream of dry air is bubbled into 3 g (B100) samples maintained at 110° C., volatile oxidation products such as carboxylic acids, mainly formic acids are carried through the detector chamber containing deionized water. The change in conductivity is measured and recorded every 36 seconds (0.01 hour).

The increase in conductivity is measured as a function of time until maximal change which reflects the IP.

Determination of Kinematic Viscosity and Acid Number

The viscosity of biodiesel at 40° C. was determined following ASTM D 445 using a Rheotek AKV8000 automated kinematic viscometer (Poulten Selfe & Lee Ltd., Essex, England). Acid number of biodiesel was determined according to ASTM D 664 using a Brinkman/Metrohm 809 Titrando (Westbury, N.Y.). The acid number is the quantity of base, expressed as milligrams of potassium hydroxide (KOH) per gram of sample, required to reach the equivalence point.

Determination of Free Glycerin and Total Glycerin

Free glycerin and total glycerin were determined according to ASTM D 6584 with a PerkinElmer Clarus 500 GC equipped with a flame ionization detector (GC-FID). A PE-5HT column (15 m in length, with a 0.32 mm internal diameter, and a 0.1 μm film thickness) was used. The column was held at 50° C. for 1 minute and then ramped to 180° C. at 15° C./min, 230° C. at 7° C./min, and 380° C. at 30° C./min, respectively. Finally, it was held at 380° C. for 10 minutes. Hydrogen (99.9999%, Cryogenic Gases, Detroit, Mich.) was used as the carrier gas with a flow rate of 3 mL/min.

Measurement of Cloud Point, Pour Point, and Cloud Filter Plugging Point

The cloud point (CP), pour point (PP), and cloud filter plugging point (CFPP) measurements were done as per ASTM standards, D 2500-25 for CP, D 97-96a for PP, and D 6371-05 for CFPP. A Lawler model DR-34H automated cold properties analyzer (Lawler Manufacturing Corporation, Edison, N.J.) was used to measure the cold flow properties.

Example 1

Characterization of Samples

SBO, DSBO, CSO, PF, YG were evaluated for viscosity, acid number, free glycerin, total glycerin, cloud point, pour point, coldfilter plugging point and induction period. Data are summarized in Table 1. On the whole, most of the values were within the limits given by ASTM D6751-07. YG-based biodiesel had an acid number above the ASTM standard. SBO- and CSO-based biodiesel met the limit of a 3-hour induction period; however, PF-, YG-, and DSBO-based biodiesel did not meet the oxidative stability specification. The IP of CSO-based biodiesel was the highest without added antioxidant among the five types of biodiesel.

methyl linoleate (C18:2) is the predominant FAME (48.7%); followed by methyl oleate (C18:1, 25.3%), and methyl palmitate (C16:0, 14.1%). As expected, the FAME compositions of DSBO-based biodiesel and SBO-based biodiesel are nearly identical. Similarly, for YG-based biodiesel, methyl linoleate is the predominant FAME (46.2%), followed by methyl oleate (31.43%), and methyl palmitate (16.1%). CSO-based biodiesel also was predominantly methyl linoleate (53%), but with methyl palmitate having the second greatest abundance (24.7%), followed by methyl oleate (18.5%). The FAME composition of PF-based biodiesel differed greatly from the vegetable oil-based biodiesel, where methyl oleate (36.6%) was the predominant FAME, followed by methyl linoleate (27%), and methyl palmitate (21.8%). For SBO-based biodiesel, total saturated FAME (19.2%) was lower than the values of CSO (28.2%) and PF (30.9%).

TABLE 2

| | FAME composition (wt) % | | | | |
|---|---|---|---|---|---|
| FA | SBO | Distilled SBO | CSO | PF | YG |
| C14:0 | 0 | 0 | 0.76 | 1.04 | 0.14 |
| C16:0 | 14.1 | 16.02 | 24.74 | 21.82 | 16.12 |
| C16:1 | 0.7 | 0.56 | 0.37 | 3.71 | 0.02 |
| C18:0 | 5.15 | 5.37 | 2.68 | 7.61 | 3.96 |
| C18:1 | 25.29 | 26.51 | 18.45 | 36.59 | 31.43 |
| C18:2 | 48.7 | 46.31 | 52.99 | 27.02 | 46.05 |
| C18:3 | 6.08 | 5.23 | 0 | 1.78 | 2.28 |
| ΣSFA (%) | 19.2 | 21.39 | 28.2 | 30.9 | 20.22 |
| ΣUFA (%) | 80.8 | 78.61 | 71.8 | 69.1 | 79.78 |

The oxidative stability of biodiesel in general depends on the FAME compositions as well as the presence of natural antioxidants in the feedstock. High levels of unsaturated fatty acids make the biodiesel more susceptible to oxidation and resultant shorter induction times. The CSO-based biodiesel has less unsaturated FAME than SBO-based biodiesel, and the IP is indeed higher for CSO-based biodiesel. Moreover, the natural antioxidants appear to remain in the distillation residue following distillation, which results in a lower IP in DSBO-based biodiesel than SBO-based biodiesel while having the same FAME composition. Previous studies have also shown that undistilled biodiesel is more stable when compared with distilled biodiesel. It is interesting to note that PF-based biodiesel has a lower unsaturated FAME content; however it exhibits poor oxidative stability, as compared to SBO-based biodiesel. This can be attributed to lower concen-

TABLE 1

| | ASTM method | ASTM specification | SBO | DSBO | CSO | PF | YG | ULSD |
|---|---|---|---|---|---|---|---|---|
| Viscosity, 40° C. (mm²/s) | D 445 | 1.9-6.0 | 4.336 | 4.050 | 4.221 | 4.386 | 4.552 | 2.154 |
| Acid number (mg KOH/g) | D 664 | 0.5 max | 0.215 | 0.179 | 0.262 | 0.298 | 0.515 | 0.005 |
| Free glycerin (mass %) | D 6584 | 0.020 | 0.006 | 0 | 0.001 | 0.001 | 0.000 | — |
| Total glycerin (mass %) | D 6584 | 0.24 | 0.177 | 0 | 0.186 | 0.143 | 0.016 | — |
| Cloud point (° C.) | D 2500 | Report | 3 | 4 | 6 | 7 | 13 | −25 |
| Pour point (° C.) | D 97 | | −3 | 0 | 0 | 3 | 0 | −36 |
| Cold filter plugging point (° C.) | D 6371 | | −3 | 0 | 3 | 2 | −3 | −26 |
| Oxidative stability Induction Period (hour) | EN 14112 | 3 minimum | 3.52 | 0.77 | 6.57 | 0.67 | 2.25 | — |

The FAME compositions for the different biodiesel samples are shown in Table 2. For SBO-based biodiesel, trations of naturally occurring antioxidants in PF-based biodiesel. Similar results have shown that the vegetable oil-based biodiesel is more stable than animal fat-based biodiesel.

Example 2

Effect of Antioxidants on Oxidative Stability of SBO-Biodiesel

FIG. 1 shows the IP of SBO-based biodiesel as a function of the concentration of added antioxidant. The oxidative stability was measured as described above. Antioxidants were added to the SBO-based biodiesel in a concentration range between 250 and 1000 ppm. Generally, the IP of samples were observed to increase with the increasing antioxidant concentration. PY was found to be the most effective antioxidant in terms of increasing IP over the range of 250-1000 ppm, while α-T shows the smallest increase. PG was the second most effective antioxidant in the range of concentrations between 250 and 500 ppm, followed by TBHQ, however, TBHQ was more effective than PG at 1000 ppm. The addition of BHA, BHT, DTBHQ, and IB was found to increase IP, and their effects are very close to each other with BHA exhibiting the highest IP increase at concentrations near 1000 ppm.

Previous studies have shown that for soy based biodiesel as measured by viscosity, TBHQ was the most effective while PG increased slightly and BHT and BHA show no improvement. It has also been shown that BHT displayed the highest effectiveness in the concentration range from 200 to 7000 ppm in refined soybean oil based biodiesel, TBHQ displayed a greater stabilizing potential at 8000 ppm, while BHA showed no noticeable increase from 2000 to 8000 ppm. It should be noted in the study described above; the original biodiesel had a very low IP (0.16 hour), and different range of additive concentrations were used in this study. Therefore, different results on antioxidant may be due to differences in the feedstocks of biodiesel, and experimental protocols.

Figure 2:
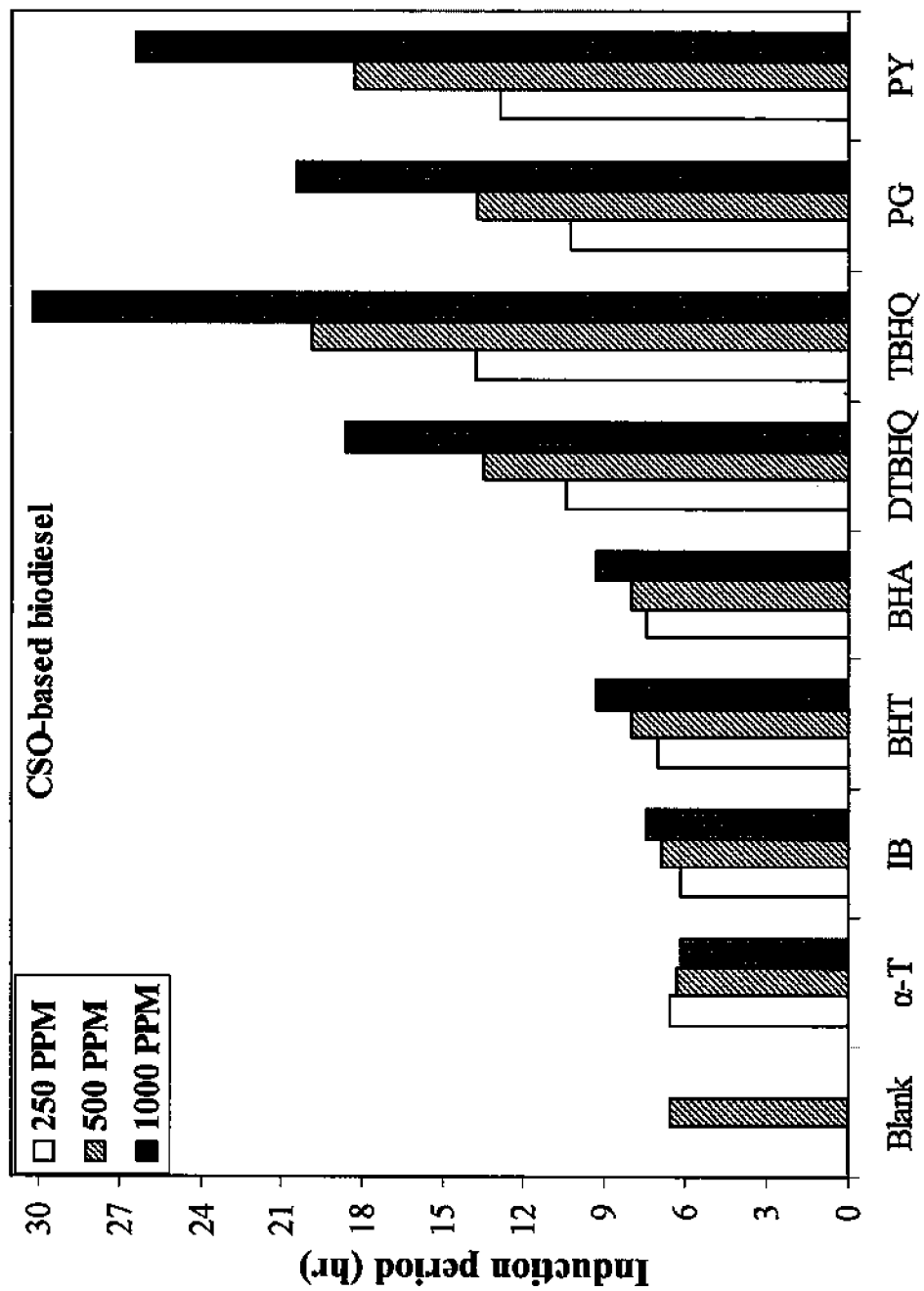
FIG. 2 shows the effects of concentration of α-T, IB, BHT, BHA, DTBHQ, TBHQ, PG, and PY on the induction period of cottonseed oil (CSO-) based biodiesel.
Figure 3:
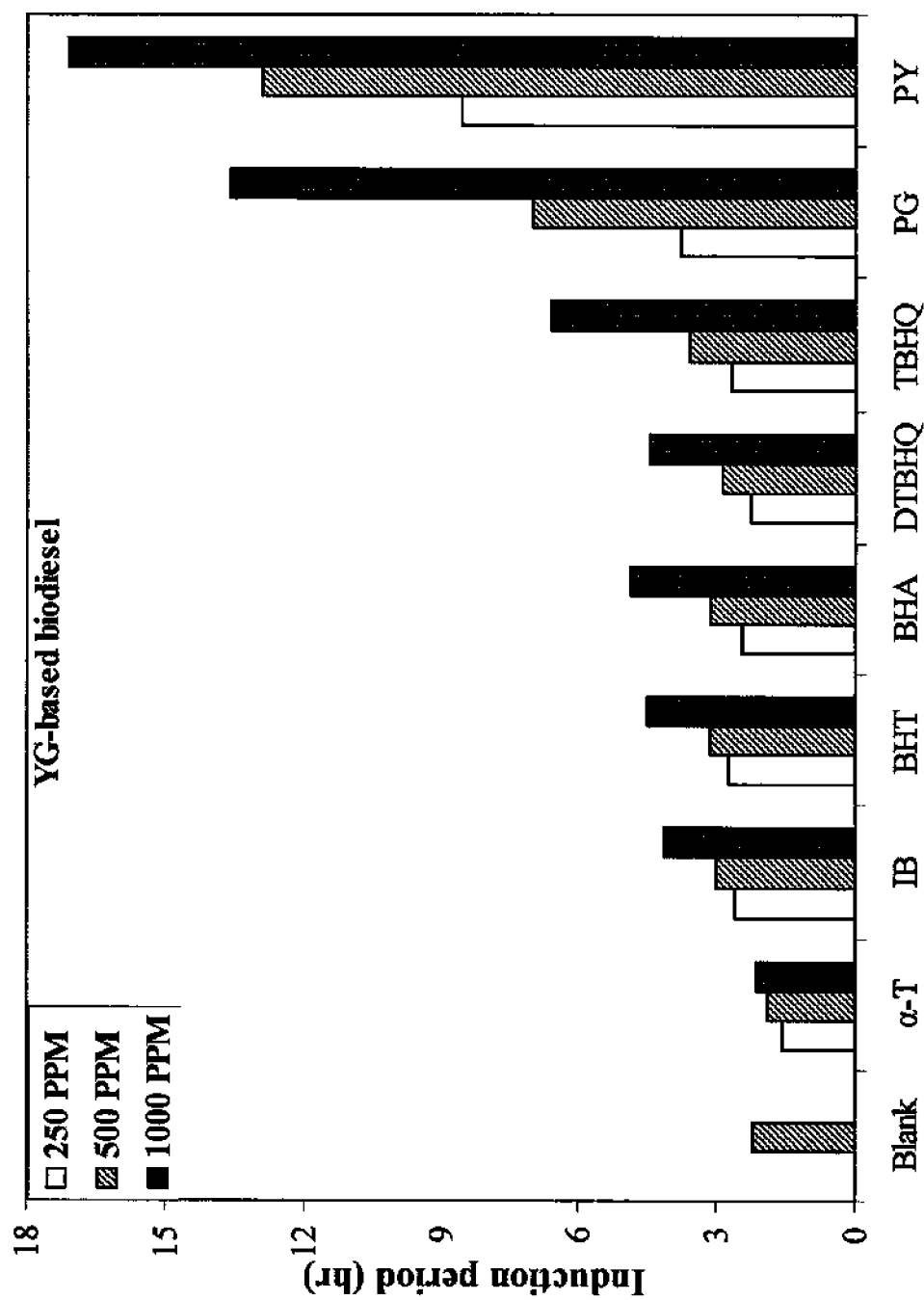
FIG. 3 shows the effects of concentration of α-T, IB, BHT, BHA, DTBHQ, TBHQ, PG, and PY on the induction period of yellow grease (YG-) based biodiesel.
Figure 4:
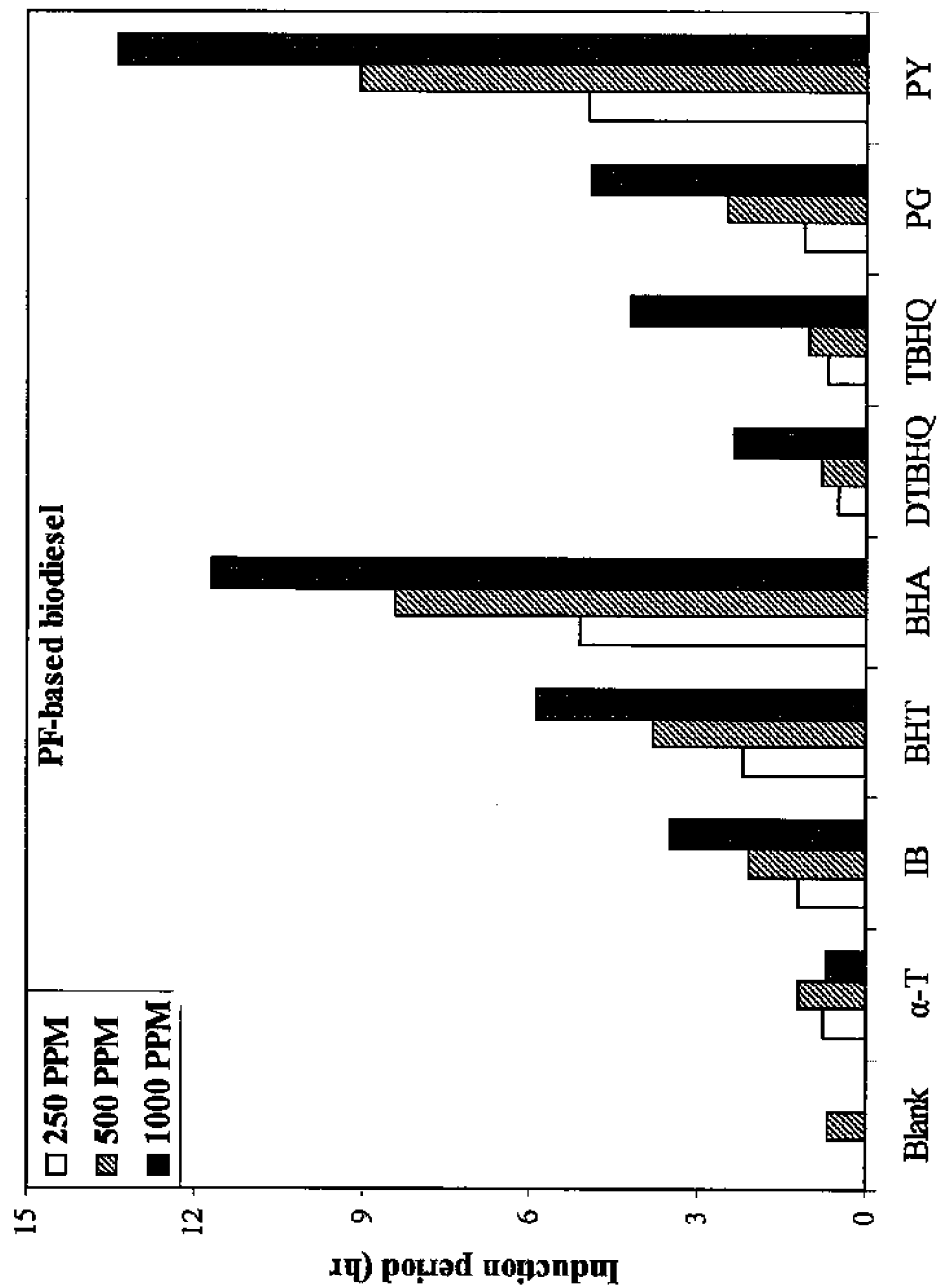
FIG. 4 shows the effects of concentration of α-T, IB, BHT, BHA, DTBHQ, TBHQ, PG, and PY on the induction period of poultry fat (PF-) based biodiesel.

We have determined the effects of the concentration of eight antioxidants on the oxidative stability of CSO-, YG-, and PF-based biodiesel are shown in FIGS. 2, 3, and 4, respectively. All antioxidants were found to increase the IP with increasing concentration.

Example 3

Effect of Antioxidants on Oxidative Stability of CSO-Based Biodiesel

FIG. 2 shows that for CSO-based biodiesel, TBHQ gave the highest IP increase at 250-1000 ppm, followed by PY, PG, and DTBHQ. BHA and BHT had almost the same effectiveness with the CSO-based biodiesel. However, IB displayed no noticeable increase in oxidative stability at 250 ppm and 500 ppm, and only a slight increase at 1000 ppm. Compared to the SBO-based biodiesel, the effectiveness of antioxidants for CSO-based biodiesel was somewhat different, with TBHQ having the greatest effect on oxidative stability, reaching to 30.2 hours at 1000 ppm.

Effect of Antioxidants on Oxidative Stability of YG-Based Biodiesel

FIG. 3 shows that the untreated YG-based biodiesel sample did not reach the ASTM specification for B100 (2.25 hours vs. 3 hours). The effectiveness of antioxidants on the IP of YG-based biodiesel is very similar to SBO-based biodiesel: PY produced the best improvement. PG was the second most effective antioxidant followed by TBHQ, BHA, BHT, DTBHQ, and IB. However, the addition of α-T had no or even negative effects. It was noted that only PY at 250 ppm can improve the IP>6 hours, as well as PG at 500 ppm and TBHQ at 1000 ppm.

Effect of Antioxidants on Oxidative Stability of PF-Based Biodiesel

As shown in FIG. 4, the IP of untreated PF-based biodiesel was very low (0.67 hour). PY was found to provide the greatest improvement, followed by BHA. BHT was the third most effective antioxidant, meeting the ASTM specification (>3 hour) at 500 ppm while PG, TBHQ, and IB were effective only at 1000 ppm. The addition of DTBHQ even at 1000 ppm was ineffective in meeting ASTM specs. No noticeable increase in oxidative stability was observed by the addition of α-T. The experiments above (FIGS. 1-4) show that all of the test antioxidants except the natural antioxidant α-T had a measurable positive impact on the oxidative stability of all different types of biodiesel. The pattern of effectiveness for antioxidants on SBO-, CSO- and YG-based biodiesel is BHA~BHT<DTBHQ~TBHQ<PG~PY, with the exception of TBHQ having the most effect on the oxidative stability for CSO-based biodiesel.

The different effects of antioxidants can be attributed to their molecular structures. These types of antioxidants have an aromatic ring with different functional groups at different position of the ring. The active hydroxyl group can provide protons that combine with oxidized free radicals, thus delaying the initiation of or slowing the rate of oxidation. Based on their electro-negativities (which is defined as the tendency of the hydroxyl group to attract a bonding pair of electrons), the antioxidants having an active hydroxyl groups (—OH) can be ranked as: BHA~BHT<DTBHQ TBHQ<PG~PY. For vegetable oil based biodiesel, they were almost in accordance with the rank. However, the antioxidant action on PF-based biodiesel was different: the rank is TBHQ<BHT<<PY~BHA. These suggest that the effect of antioxidants on biodiesel depend on the oil feedstock. Similar results were also observed elsewhere.

Effect of Antioxidant on Oxidative Stability of DSBO-Based Biodiesel

Figure 5:
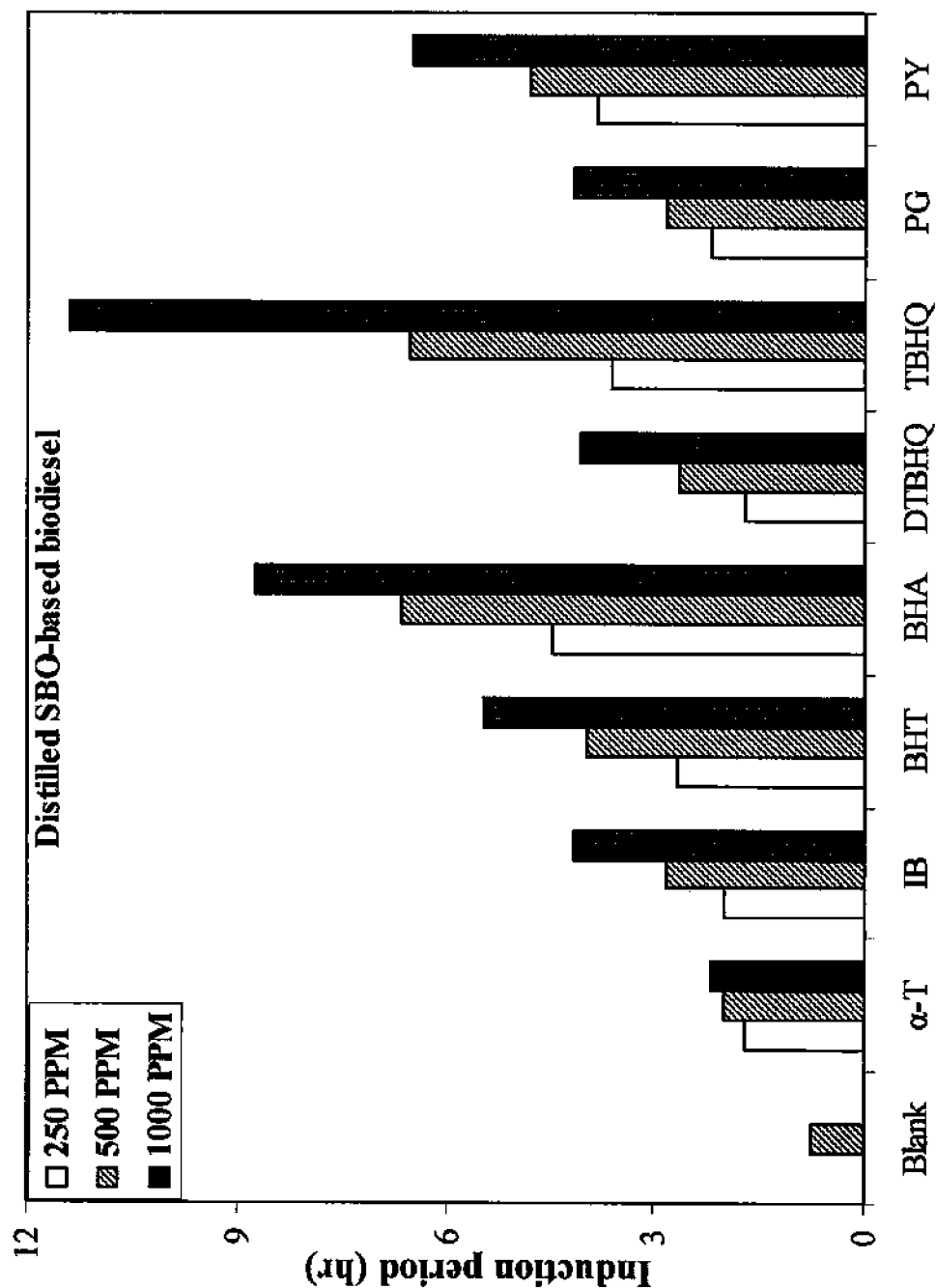
FIG. 5 shows the effects of concentration of α-T, IB, BHT, BHA, DTBHQ, TBHQ, PG, and PY as a function of induction period of distilled SBO-based biodiesel.

FIG. 5 shows the IP of DSBO-based biodiesel as a function of the concentration of eight antioxidants. The DSBO-based biodiesel without antioxidant has a much lower oxidative stability (0.77 hours) than undistilled (3.52 hours). With the distilled sample, TBHQ and BHA achieved the best result, followed by PY, and then by BHT, DTBHQ, PG, and IB having similar effects. The addition of α-T had the smallest increase on IP. It was noted that TBHQ and BHA at 500 ppm and PY at 1000 ppm could improve the IP>6 hours. These results differed somewhat from those for undistilled SBO.

It has been previously demonstrated that TBHQ is more effective compared to BHT with distilled palm diesel. Although the distilled and undistilled samples had almost the same FAME composition, they contained different levels of natural antioxidants, total glycerin content, and sterol glucosides. One recent study has reported that relative antioxidant content, FAME compositions, and total glycerin content impacted the oxidative stability of biodiesel. The different content of minor components is the likely explanation for the different effects of antioxidants on undistilled and distilled biodiesel.

Example 4

Effect of Antioxidant on Oxidative Stability of SBO-Based B100 and B20

Figure 6:
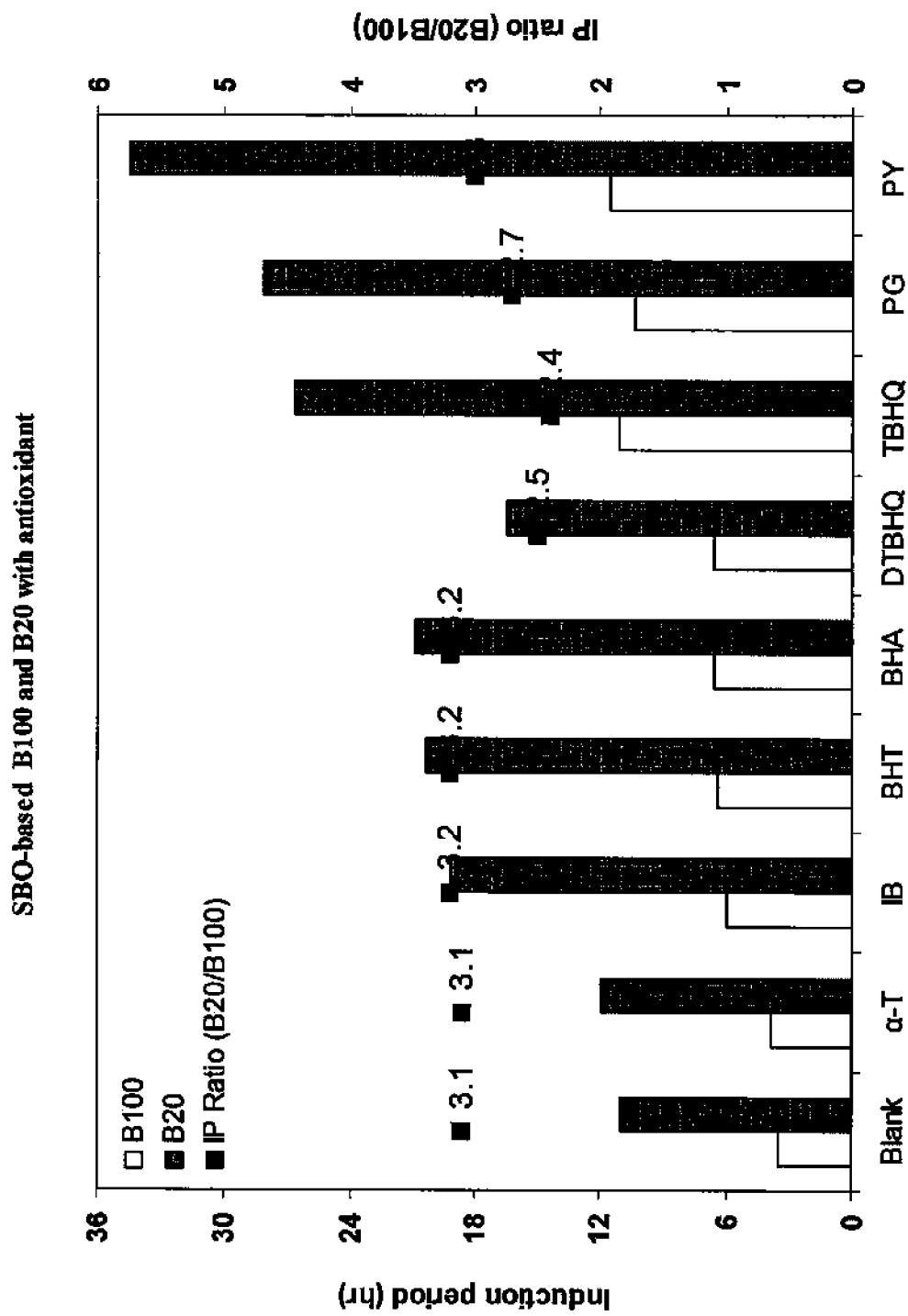
FIG. 6 shows the effects of antioxidants on the induction period of SBO-based B100 and B20.

In FIG. 6, the effect of eight types of antioxidants on the IP of both B20 and B100 soy-based biodiesel is shown. Antioxidant was added at a concentration of 200 ppm for the B20 and 1000 ppm for the B100. The IP of untreated B20 is significantly higher than that of the B100. For B20 samples, the addition of PY resulted in the highest IP (34.49 hours), followed by PG and TBHQ. BHA, BHT, DTBHQ, and IB had similar effects; whereas α-T was not effective. For B100, there is a similar observation on the effect of antioxidant. Moreover, the ratios of IP between B20 and B100 for different antioxidants were observed to be relatively constant (2.4~3.2). These results suggested that the effect of antioxidants on B20 and B100 was similar.

Figure 7:
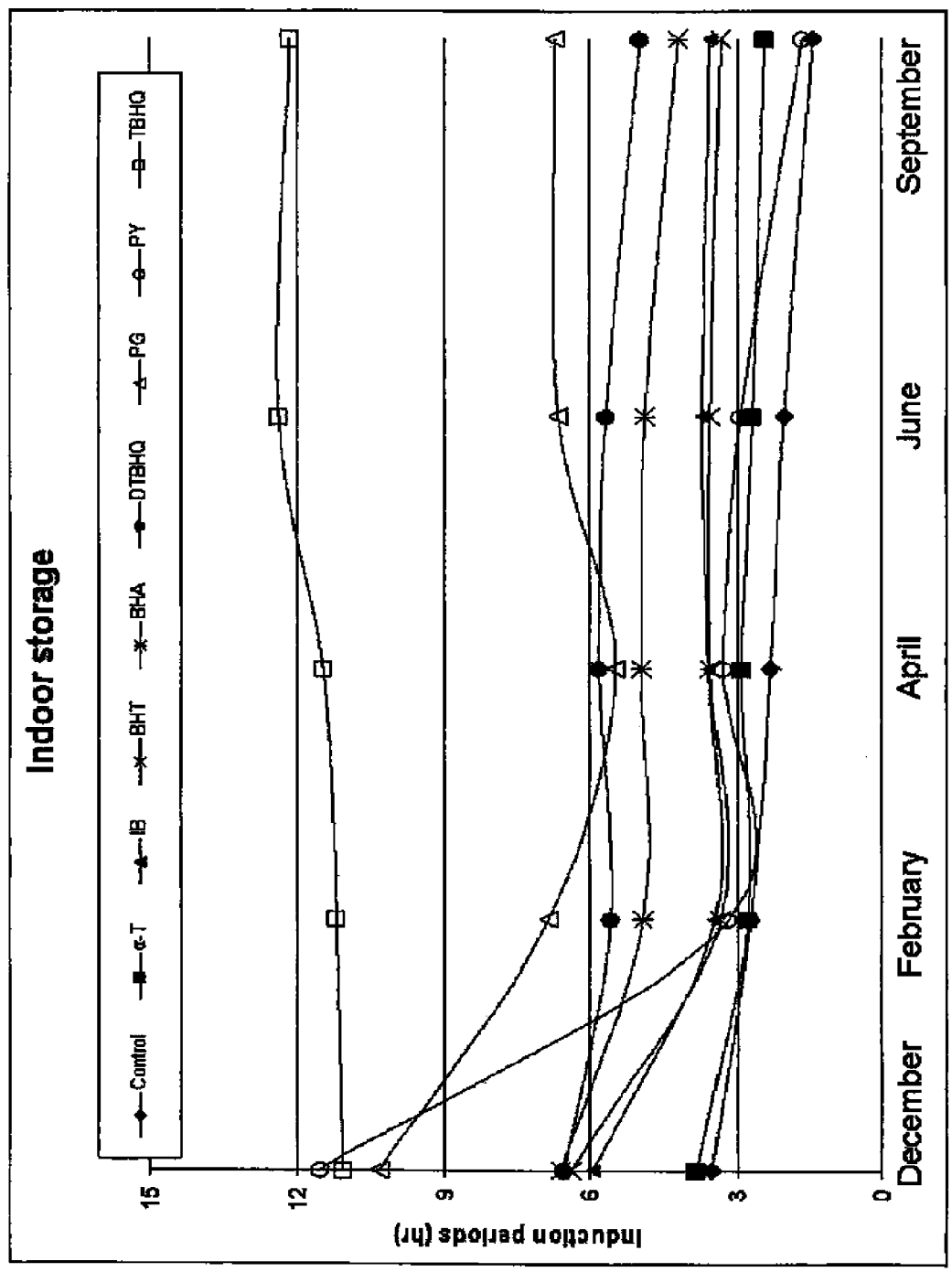
FIG. 7(a) shows the effects of antioxidants on the induction period of SBO-based biodiesel as a function of stored time indoors.
FIG. 7(b) shows the effects of antioxidants on the induction period of SBO-based biodiesel as a function of stored time outdoors.
Figure 7:
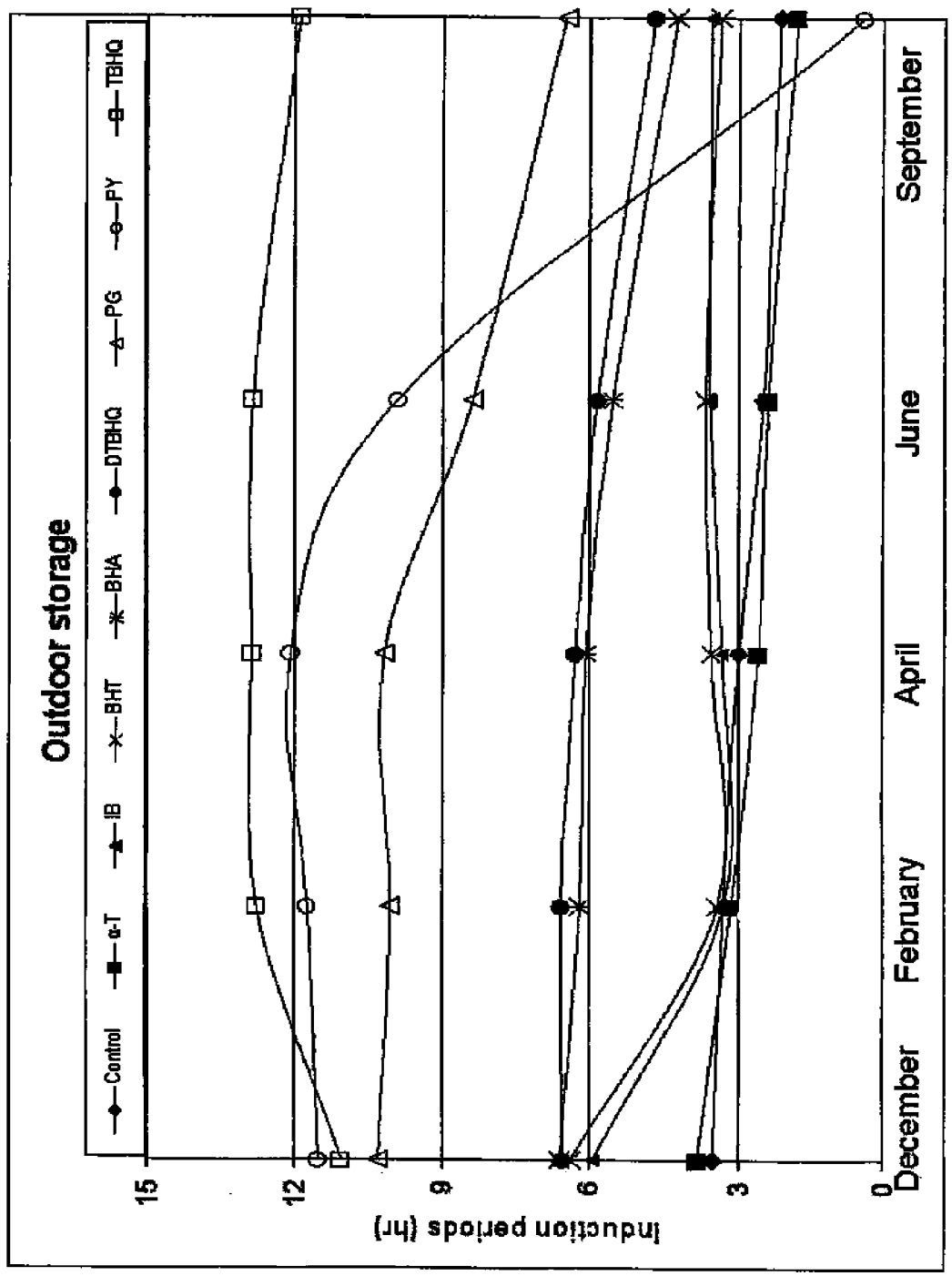

To determine the effect of antioxidants on biodiesel oxidative stability under long-term storage conditions, the IP of SBO-based biodiesel during indoor and outdoor storage were measured as a function of time (FIGS. 7a and b). For indoor storage, the fuel was stored at constant room temperature (23° C.), while for outdoor storage, conditions of the Michigan ambient temperature from December, 2006 to September, 2007 prevailed (Table 3).

TABLE 3

|  | Month | | | | | | | | | |
| --- | --- | --- | --- | --- | --- | --- | --- | --- | --- |
|  | December, 2006 | January, 2007 | February, 2007 | March, 2007 | April, 2007 | May, 2007 | June, 2007 | July, 2007 | August, 2007 | September, 2007 |
| Max ° C. | 4.7 | 0.2 | −4.3 | 8.4 | 12.4 | 21.6 | 26.7 | 27.4 | 26.9 | 23.9 |
| Min ° C. | −2.2 | −7.4 | −13.1 | −2.5 | 1.2 | 8.1 | 12.2 | 12.7 | 15.2 | 11 |
| Ave ° C. | 1.2 | −3.7 | −8.7 | 2.9 | 6.8 | 14.8 | 19.4 | 20.1 | 21 | 17.4 |

In FIG. 7a, the IP of untreated SBO-based biodiesel gradually and nearly linearly decreased by 59.6% (from 3.52 hours to 1.42 hours) over the 9 month indoor storage conditions, while the initial IP by the addition of TBHQ was observed to be higher (11.08 hours) and is very stable for up to 9 months. The initial value of IP of SBO-based biodiesel with DTBHQ, BHA, and α-T are 6.54 hours, 6.59 hours, and 3.84, respectively, and then gradually decreased by 23.7%, 36.4%, and 36.5% for up to 9 months. Moreover, the initial IP of biodiesel with PG, BHT, and IB were 10.32 hours, 6.37 hours, and 5.94 hours, and decreased very rapidly by 33.7%, 47.9%, and 40.4% after two month of storage, respectively. After that, IP was slightly decreased for up to 9 months. However, the oxidative stability of biodiesel with PY was found to significantly decrease from 11.54 hours to 1.65 hours after 9 months. Only TBHQ and PG could retain the IP to 6 hours for up to 9-month indoors storage.

Under outside storage conditions, samples were exposed to a range of low and high temperature during the 9-month period. The oxidative stability of untreated SBO-based biodiesel decreased gradually by 38.8% (FIG. 7b). At the same time, adding TBHQ resulted in a stable IP for up to 9 months. The effect of BHT (decrease by 47.1%) and IB (decrease by 40.1%) under outdoor storage was very similar to indoors. However, the stability of biodiesel with DTBHQ, BHA, PY, PG, and α-T during the outdoor storage period is different with indoors: with a slow decrease in oxidative stability during the first 4-month period (winter time), and then rapid decrease after that (summer time). Those samples with added PY had a significant decrease from 9.89 hours to 0.4 hours during the 6 to 9 month period. Clearly, the Michigan ambient temperature during the summer period significantly affected the effectiveness of antioxidants PY, PG, DTBHQ, and BHA. Notably, TBHQ and PG were able to maintain an IP of 6 hours for up to 9-months outdoor storage. Others have reported that TBHQ decreased by approximately 8% of its initial value, whereas PY did not show any significant variation under commercial storage conditions over one year.

Table 4 shows the acid number of SBO-based biodiesel with different antioxidants as function of storage time. The acid number is an indicator for the stability of the fuel because the acid value may increase as the fuel is oxidized. The value of the acid number for untreated SBO-based biodiesel increased with time under both indoor and outdoor storage. Samples with antioxidants α-T, IB, BHT, BHA, DTBHQ, and TBHQ have slight increases in acid number. However, these values are within the specification (0.5KOH mg/g). Interestingly, the initial values of acid number by adding of both PY and PG were observed to reach to 0.91 and 0.496 KOH mg/g, respectively, and they were not very stable during storage. This can be attributed to poor solubility of PY and PG in biodiesel. Similar results have been shown previously. The viscosity of SBO-based biodiesel with different antioxidants as function of storage time was also measured (Table 5). Viscosity of biodiesel increases when the sample is oxidized to form the polymeric compounds. The values of viscosity for all of samples were found to slightly increase for up to 9 months. However, the limit value (6.0 mm$^2$/s) at 40° C. was not reached in any cases. These results suggested that the changes in acid number and viscosity may not correlate closely with the changes in oxidation stability of biodiesel.

TABLE 4

|  | Acid Number (mg KOH/g) | | | | | | | | |
| --- | --- | --- | --- | --- | --- | --- | --- | --- | --- |
|  | Indoor | | | | | Outdoor | | | |
| Antioxidant | Control | 2-mon | 4-mon | 6-mon | 9-mon | 2-mon | 4-mon | 6-mon | 9-mon |
| blank | 0.176 | 0.217 | 0.245 | 0.27 | 0.296 | 0.214 | 0.233 | 0.242 | 0.282 |
| α-T | 0.224 | 0.217 | 0.238 | 0.245 | 0.245 | 0.205 | 0.225 | 0.239 | 0.263 |
| IB | 0.212 | 0.223 | 0.233 | 0.242 | 0.234 | 0.209 | 0.229 | 0.233 | 0.237 |
| BHT | 0.211 | 0.22 | 0.23 | 0.246 | 0.244 | 0.209 | 0.229 | 0.232 | 0.243 |
| BHA | 0.203 | 0.194 | 0.235 | 0.243 | 0.244 | 0.204 | 0.216 | 0.228 | 0.242 |
| DTBHQ | 0.212 | 0.208 | 0.244 | 0.256 | 0.256 | 0.212 | 0.23 | 0.247 | 0.29 |
| TBHQ | 0.212 | 0.222 | 0.234 | 0.245 | 0.229 | 0.212 | 0.222 | 0.231 | 0.227 |

TABLE 4-continued

| | Acid Number (mg KOH/g) | | | | | | | | |
|---|---|---|---|---|---|---|---|---|---|
| | | Indoor | | | | Outdoor | | | |
| Antioxidant | Control | 2-mon | 4-mon | 6-mon | 9-mon | 2-mon | 4-mon | 6-mon | 9-mon |
| PG | 0.496 | 0.479 | 0.519 | 0.792 | 0.546 | 0.485 | 0.508 | 0.78 | 0.3 |
| PY | 0.914 | 0.743 | 0.478 | 0.445 | 0.373 | 0.988 | 0.797 | 0.373 | 0.511 |

TABLE 5

| | Kinematic viscosity (mm²/s) | | | | | | | | |
|---|---|---|---|---|---|---|---|---|---|
| | | Indoor | | | | Outdoor | | | |
| Antioxidant | Control | 2-mon | 4-mon | 6-mon | 9-mon | 2-mon | 4-mon | 6-mon | 9-mon |
| blank | 4.321 | 4.291 | 4.326 | 4.364 | 4.419 | 4.292 | 4.299 | 4.319 | 4.329 |
| α-T | 4.381 | 4.35 | 4.353 | 4.373 | 4.396 | 4.339 | 4.352 | 4.384 | 4.423 |
| IB | 4.295 | 4.325 | 4.307 | 4.319 | 4.329 | 4.288 | 4.292 | 4.306 | 4.322 |
| BHT | 4.302 | 4.323 | 4.313 | 4.331 | 4.35 | 4.312 | 4.293 | 4.317 | 4.334 |
| BHA | 4.315 | 4.312 | 4.325 | 4.344 | 4.379 | 4.291 | 4.297 | 4.33 | 4.394 |
| DTBHQ | 4.298 | 4.3 | 4.304 | 4.311 | 4.314 | 4.303 | 4.3 | 4.307 | 4.309 |
| TBHQ | 4.321 | 4.306 | 4.303 | 4.316 | 4.318 | 4.288 | 4.299 | 4.315 | 4.317 |
| PG | 4.329 | 4.324 | 4.338 | 4.363 | 4.361 | 4.346 | 4.323 | 4.337 | 4.369 |
| PY | 4.292 | 4.348 | 4.32 | 4.344 | 4.377 | 4.332 | 4.295 | 4.301 | 4.337 |

SBO and PF were vacuum distilled to eliminate effects on the oxidative stability by impurities such as trace metals. The trace Cu and Fe levels within the distilled biodiesel were determined using a Perkin-Elmer Optima 2100 DV optical emission spectrometer (Restek, Bellefonte, Pa., USA) and were found to be in the range of 0.0001 ppm and 0.001 ppm, respectively. Oxidation of the samples using the Rancimat at 110° C. with the addition of 0.01% and 0.02% citric acid metal chelator indicated negligible effect of metals in the oxidation.

Table 6 summarizes the IP, TAN and viscosity results for the distilled and undistilled biodiesel along with the limit values in the biodiesel standard. FAME compositions, total SFA and UFA, and natural AO content of the biodiesel are shown in Table 7. As expected, the FAME compositions of distilled and undistilled biodiesel have no significant differences. SBO and DSBO are predominantly comprised of C18:2 (55.5% and 54.2%), followed by C18:1 (22.6% and 22.1%). PF and DPF, has a majority of C18:1 (40.1% and 36%) followed by C18:2 (27% and 25%). The total SFA content of SBO and DSBO (14.5% and 16.5%) is lower than that of PF and DPF (28.4% and 33.6%). These findings are in agreement with other studies.

TABLE 6

| Specification | Methods | Unit | ASTM D6751 | EN 14214 | Biodiesel Samples | | | |
|---|---|---|---|---|---|---|---|---|
| | | | | | SBO | DSBO | PF | DPF |
| Oxidative Stability (IP) | EN 14112 | hour | 3 min | 6 min | 2.68 | 0.17 | 0.52 | 0.93 |
| FAME content ≥4 double bonds | EN 14103 | % m/m | — | 1 max | — | — | — | — |
| Linolenic acid content (C18:3) | | % m/m | — | 12 max | 7.5 | 7.2 | 1.4 | 1.4 |
| Total Acid Number (TAN) | ASTM D664, EN 14104 | mg KOH/g | 0.500 max | 0.500 max | 0.525 | 0.309 | 0.550 | 0.360 |
| Kinematic viscosity (v) | ASTM D445, ISO 3104/3105 | mm²/s | 1.9-6.0 | 3.5-5.0 | 4.14 | 3.99 | 4.32 | 4.29 |

TABLE 7

| | FAME composition (wt) % | | | | | | | | | natural |
|---|---|---|---|---|---|---|---|---|---|---|
| FA | C14:0 | C16:0 | C16:1 | C18:0 | C18:1 | C18:2 | C18:3 | ΣSFA | ΣUFA | AO (ppm) |
| SBO | 0 | 10.2 | 0 | 4.3 | 22.6 | 55.5 | 7.5 | 14.5 | 85.5 | 167 |
| DSBO | 0 | 12.4 | 0 | 4.1 | 22.1 | 54.2 | 7.2 | 16.5 | 83.5 | 40 |

TABLE 7-continued

| FA | C14:0 | C16:0 | C16:1 | C18:0 | C18:1 | C18:2 | C18:3 | ΣSFA | ΣUFA | natural AO (ppm) |
|---|---|---|---|---|---|---|---|---|---|---|
| PF | 1 | 20.1 | 3.1 | 7.3 | 40.1 | 27 | 1.4 | 28.4 | 71.6 | — |
| DPF | 1.6 | 25.9 | 4.1 | 6.1 | 36 | 25 | 1.4 | 33.6 | 66.4 | — |

A study of the kinetics of lipid autoxidation reported that relative oxidation rates of UFA are as follows: C18:3>C18:2>>C18:1. In general, the higher the degree of unsaturation, especially the polyunsaturation, the higher the rate of oxidation with the total amount of C18:3 and C18:2 for SBO (63%) much higher than PF (28.4%), the IP for SBO should be expected to be much lower than the IP of PF. However, in this case it is the opposite, with the IP of SBO (2.68 hrs) being much higher than that of PF (0.52 hour). This is likely due to the amount of natural antioxidants present in the biodiesel, as indicated by previous studies which have concluded that the oxidative stability of biodiesel depends on the FAME compositions as well as other factors such as natural antioxidant content. SBO was found to contain 167 ppm of natural antioxidant while none could be detected in PF. This finding confirms the higher oxidative stability observed for vegetable oil-based biodiesel than animal fat-based biodiesel. In addition, this finding suggests that the amount of natural antioxidant plays a major role in determining the oxidative stability of biodiesel.

Upon distillation, the biodiesel minor components (sterols, glycerides and natural antioxidant) were greatly reduced. The natural antioxidant content in SBO dropped from 167 ppm to 40 ppm, while the IP decreased from 2.68 hours to 0.17 hour, on the other hand, the IP of DPF (0.93 hours) was higher than the IP of PF (0.52 hours). Even though there is a concern on the validity of an IP below 1 hour, this reproducible observation may be a result of the removal of the some oxidation products, volatile impurities and polymeric materials in the vacuum distillation. Likewise, the reduction of TAN, conforming to ASTM D6751 and EN 14214, and viscosity values support this conclusion.

The IP for all the biodiesel samples and the TAN value for the undistilled biodiesel samples did not meet the ASTM D6751-07 and EN 14214 specifications suggesting that the biodiesel samples under study were already significantly oxidized. The results also suggest that the viscosity is not greatly affected by the level of oxidation; consequently, it is not a good indicator of the level of oxidation.

Example 5

Cooperative Effects of Antioxidants

Figure 8:
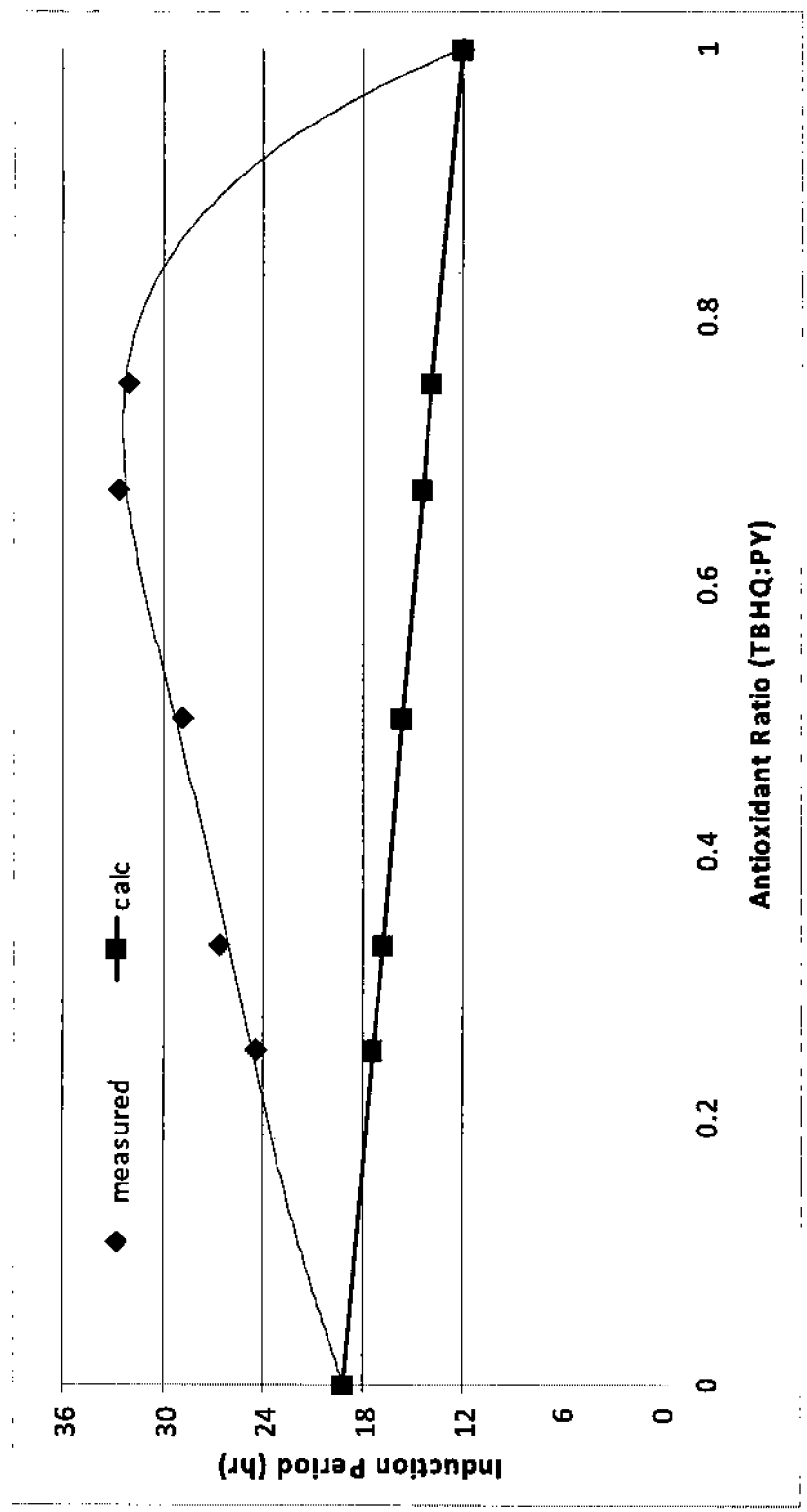
FIG. 8 shows the synergistic effects of ratios of TBHQ/PY on the induction period of DSBO-based biodiesel.

Effect of Binary Formulation of Antioxidants
TBHQ and PY were more effective in improving the oxidative stability of different types of biodiesel; therefore, we chose to evaluate binary combinations as antioxidant mixtures. FIG. 8 shows the IP of DSBO-based biodiesel as a function of the ratio of binary antioxidants at a total 1000 ppm concentration. The "calculated" line was defined by the IP of the two individual antioxidants, TBHQ and PY. It represents the increased oxidative stability from the contribution of TBHQ and PY, assuming there was no interaction. The "measured" line was based on experimental data. The "measured" IP for binary antioxidant increases significantly with the ratio of TBHQ/PY, until a maximum is reached at the ratio of 2:1 (667 ppm TBHQ and 333 ppm PY). The deviation between the measured and calculated values increases as a function of the percentage of TBHQ until a maximum was reached at around 70%. The increasing "measured" IP, as compared to "calculated" ones, indicates a synergistic effect.

Figure 9:
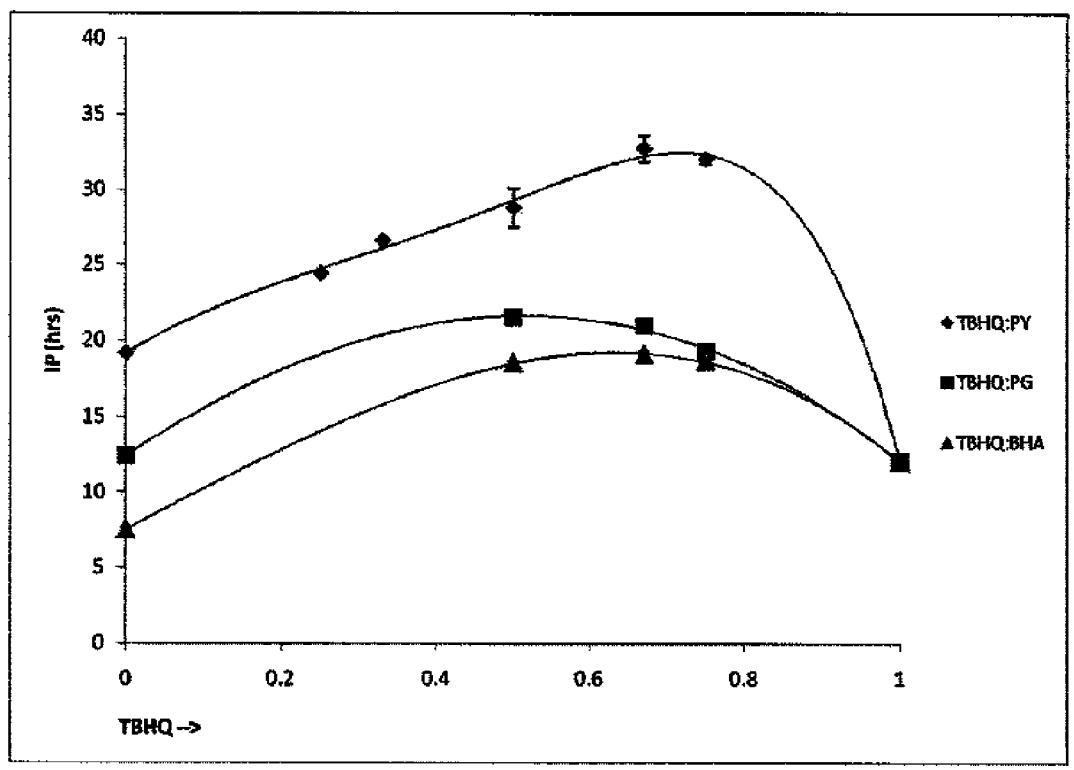
FIG. 9 (a) is a graph of the resultant IP values of using binary antioxidant blends at 1000 ppm loading: in DSBO.
Figure 9:
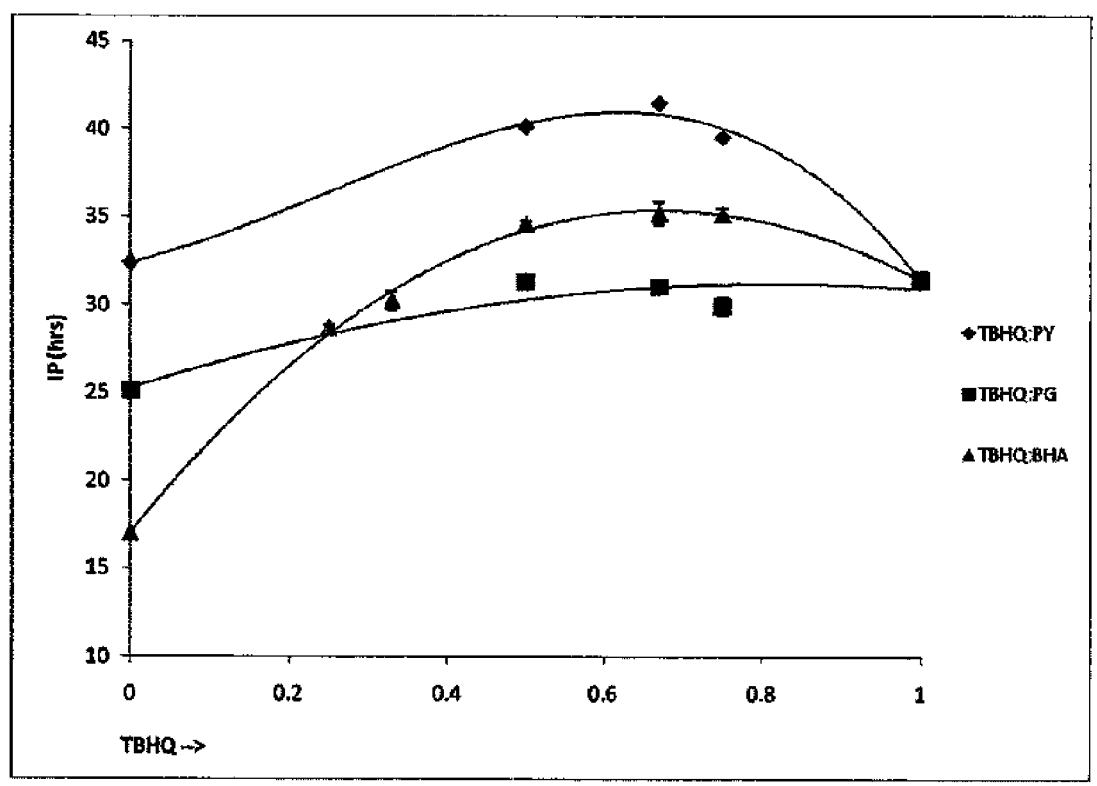

Different binary blends of antioxidants were prepared by mixing different solid phase antioxidants at weight ratios of 1:0, 0:1, 1:1, 2:1, 1:2, 3:1 and 1:3. The antioxidant blends, with a total loading of 1000 ppm, were added to DSBO-B100 and DPF-B100 and mixed thoroughly. The effects of loading (1000, 500, 250, 200, 150, 100, and 50 ppm) for selected blends were also investigated. Freshly distilled samples without any additives were used as the control for DSBO and DPF. FIG. 9(a) shows the effects of blending ratios of TBHQ:BHA, PG and PY on the IP of DSBO-B100. The highest IP (32.79 hrs) was achieved by using a 2:1 molar ratio (667 ppm TBHQ, 333 ppm PY) in DSBO. Similarly, FIG. 9(b) shows that the highest IP (43.49 hrs) was obtained by using this same antioxidant binary formulation in DPF. Using any blend ratio of TBHQ:BHA, TBHQ:PG and TBHQ:PY in DSBO and DPF resulted in an improved IP greater than when using the individual antioxidants by themselves at the same loading, regardless of type of biodiesel.

Table 8 summarizes the effects of the different antioxidant blends on the pertinent parameters relating to oxidative stability (IP, TAN, viscosity and stabilization factor (SF) which expresses the antioxidant effectiveness by the IP ratio of inhibited and uninhibited oxidation). The most effective antioxidant is PY, followed by PG, TBHQ and finally BHA during oxidation of DSBO and DPF at 110° C. is in good agreement with previous studies. The antioxidant effectiveness (based on SF) in both DSBO and DPF is highest with PY (individual or in binary formulation). Biodiesel with PG or PY loading produced increased TAN values. The highest TAN values 0.521 and 0.433 mg KOH/g with 2:1 TBHQ:PG in DSBO and DPF, respectively, were observed. On the other hand, there was very little difference in viscosity, as the increase in viscosity is linked more to the oxidation products.

TABLE 8

| Biodiesel | Antioxidant | Concentration ppm | M × $10^{-4}$ | Ratio Weight | Molar | IP (hour) | TAN (mg KOH/g) | Viscosity, 40° C. (mm$^2$/s) | SF | % SYN |
|---|---|---|---|---|---|---|---|---|---|---|
| DSBO | TBHQ | 500 | 3.5 | | | 6.85 | | | 40.29 | |
| | TBHQ | 667 | 4.6 | | | 8.73 | | | 51.35 | |
| | BHA | 333 | 2.1 | | | 4.00 | | | 23.53 | |

TABLE 8-continued

| Biodiesel | Antioxidant | Concentration | | Ratio | | IP | TAN | Viscosity, 40° C. | SF | % SYN |
|---|---|---|---|---|---|---|---|---|---|---|
| | | ppm | M × 10⁻⁴ | Weight | Molar | (hour) | (mg KOH/g) | (mm²/s) | | |
| | PG | 500 | 2.7 | | | 10.46 | | | 61.53 | |
| | PY | 333 | 3 | | | 15.82 | | | 93.06 | |
| | TBHQ:BHA | 1000 | 6.7 | 2:1 | 2:1 | 19.51 | 0.342 | 4.03 | 114.77 | 56.09 |
| | TBHQ:PG | 1000 | 6.2 | 1:1 | 1:1 | 21.55 | 0.521 | 4.02 | 126.76 | 25.99 |
| | TBHQ:PY | 1000 | 7.6 | 2:1 | 1:1 | 32.69 | 0.431 | 4.02 | 192.29 | 34.32 |
| DPF | TBHQ | 500 | 3.5 | | | 17.43 | | | 19.28 | |
| | TBHQ | 667 | 4.6 | | | 21.05 | | | 22.63 | |
| | BHA | 333 | 2.1 | | | 11.05 | | | 11.88 | |
| | PG | 500 | 2.7 | | | 19.52 | | | 20.99 | |
| | PY | 333 | 3 | | | 25.11 | | | 27 | |
| | TBHQ:BHA | 1000 | 6.7 | 2:1 | 2:1 | 35.21 | 0.406 | 4.33 | 37.86 | (13.36) |
| | TBHQ:PG | 1000 | 6.2 | 1:1 | 1:1 | 31.19 | 0.433 | 4.31 | 33.54 | (−13.76) |
| | TBHQ:PY | 1000 | 7.6 | 2:1 | 1:1 | 43.49 | 0.371 | 4.30 | 46.76 | (−3.93) |

Inhibition of oxidation can be expressed using two kinetic characteristics: the effectiveness and the strength of the inhibitor. The effectiveness of the inhibitor represents the possibility of blocking the propagation phase through interaction with the peroxyl radicals, which is responsible for the duration to reach the IP. The strength gives the possibility of antioxidant moieties participating in other side reactions which may change the oxidation rate during the course of IP. The effectiveness of the inhibitor systems, is expressed as the SF:

$$SF = IP_1/IP_0$$

where $IP_1$ is the IP with inhibitor while $IP_0$ is the IP of the control sample without antioxidant.

The resulting improvement in IP and the SF are in the order of PY>PG>TBHQ>BHA in DSBO and DPF (Table 8). In DPF, the SF for TBHQ and PG are similar and close to the SF for PY. This is quite different from the SFs in DSBO. In general PY (individual or in blends) have highest SF in both DSBO and DPF.

Antioxidant Synergy

Inhibitors sometimes can reinforce each other, synergistically. The percent synergism (% SYN) is calculated on the basis of the IPs observed as follows:

$$\% \, SYN = \frac{(IP_{mix} - IP_0) - [(IP_1 - IP_0) + (IP_2 - IP_0)]}{[(IP_1 - IP_0) + (IP_2 - IP_0)]} \times 100\%$$

where $IP_{mix}$, $IP_0$, $IP_1$ and $IP_2$ are the induction periods of the samples containing the mixture of inhibitors, of the control sample, and of the samples containing the individual antioxidants. A positive value defines a synergistic effect between the implicated antioxidants, while a negative value corresponds to an antagonistic effect.

The IP using the same antioxidants is much higher in DPF than in DSBO. It has been shown that antioxidants increased their response in oils with less amount of polyunsaturation which was the case for the degree of polyunsaturation of DPF versus DSBO. Similarly, all IP improvement using antioxidant blends in DPF were greater than in DSBO. In our study, all binary blends of the different antioxidants produced higher IP compared to the sum of IPs of each antioxidant component in DSBO (Table 8), hence a positive % SYN value. However, in DPF only the 1:1 TBHQ:BHA molar ratio produced a positive synergy (13.36%), while 1:1 TBHQ:PG and 2:1 TBHQ:PY resulted in antagonism (−13.76% and −3.93%, respectively), this contradicts the significant IP results above. Although there was observed negative synergy, the huge IP increase in DPF is still noteworthy. Details of this phenomenon may be linked to the high level of oxidation of the parent PF-based biodiesel as it has been shown that the synergy of antioxidants is feedstock dependent.

Based on the previous studies on antioxidant synergy and this investigation, we propose two schemes of interaction: (i) hydrogen donation of the more active antioxidant to regenerate the other antioxidant and (ii) formation of heterodimer from the moieties of the antioxidant during autoxidation. FIGS. 10(a) and 10(b) show the two proposed schemes that are assumed to work simultaneously within the system to arrive at total synergistic effect.

Antioxidant Regeneration

Primary antioxidants act as radical scavengers to inhibit oxidation. Hydrogen is abstracted from the active hydroxyl (—OH) groups and then donated to the free radical to inhibit the rate of oxidation. The resulting antioxidant is a stable radical that can react with other fatty acid free radicals and further contribute to oxidation inhibition. In the same manner, when antioxidants are present in combinations, one antioxidant can become a hydrogen donor for the other, thus regeneration takes place, as in BHA and BHT. Through this mechanism, the donor is consumed while the hydrogen acceptor antioxidant propagates its oxidation inhibition.

In FIG. 10(a), the proposed mechanism is the regeneration of PY in the TBHQ:PY blends. PY, being the more effective antioxidant, readily donates its hydrogen from its hydroxyl group to fatty acid free radicals creating an antioxidant radical in the process. TBHQ then transfers hydrogen to the antioxidant radical to regenerate it back to PY. In the process, TBHQ was converted to a radical that can form stable products with other free radicals, this together with the interaction and regeneration of PY represents an effective synergistic effect between the two antioxidants. Antioxidant quantification from long term storage study of DSBO with TBHQ:PY indicate that the consumption of TBHQ is predominant than the consumption of PY, with the total amount of PY close to its original value (values not shown here). The results support the assumption for the regenerating of PY by TBHQ.

Heterodimer Antioxidant

It has been previously shown that primary antioxidants degrade to form different species/moieties that participate in the reaction during the autoxidation of fats and oils. In these studies antioxidant mixtures initiated the formation of heterodimers from the degradation products of the primary antioxidants. Previous studies have shown that mixtures of BHA and BHT produced heterodimers of comparable activity to that of BHT. Likewise, BHT and PG produced two heterodimers composed of two phenols each, the products were found to be better antioxidants in SBO. The relationship between structure and the activity of these phenolic antioxidants been previously established. Combinations of two phenols were found to increase efficiency as compared to lone phenols.

Figure 10:
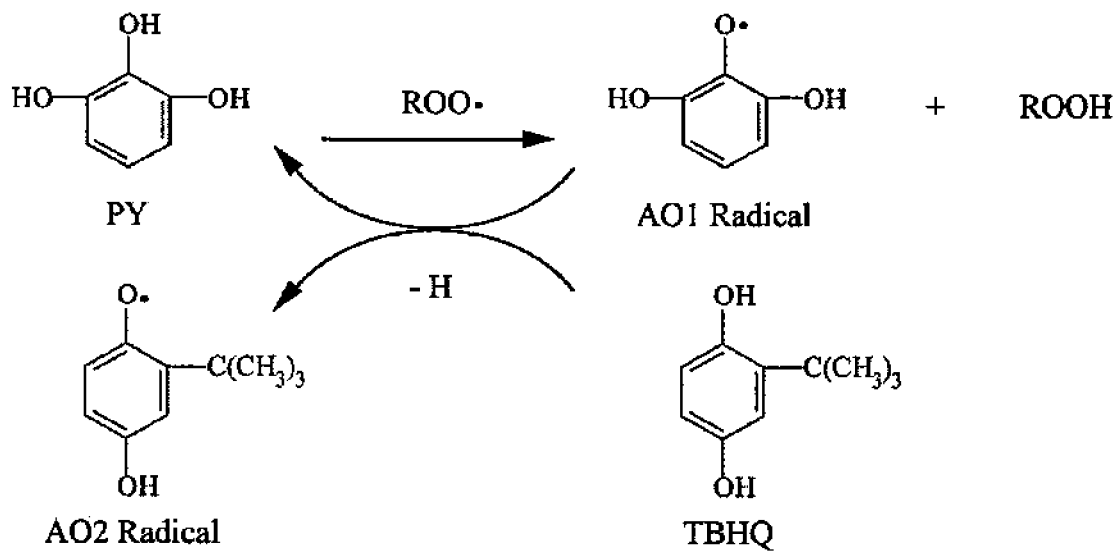
FIG. 10 (a) illustrates a potential mechanism for the synergistic interaction between TBHQ and PY via antioxidant regeneration.
Figure 10:
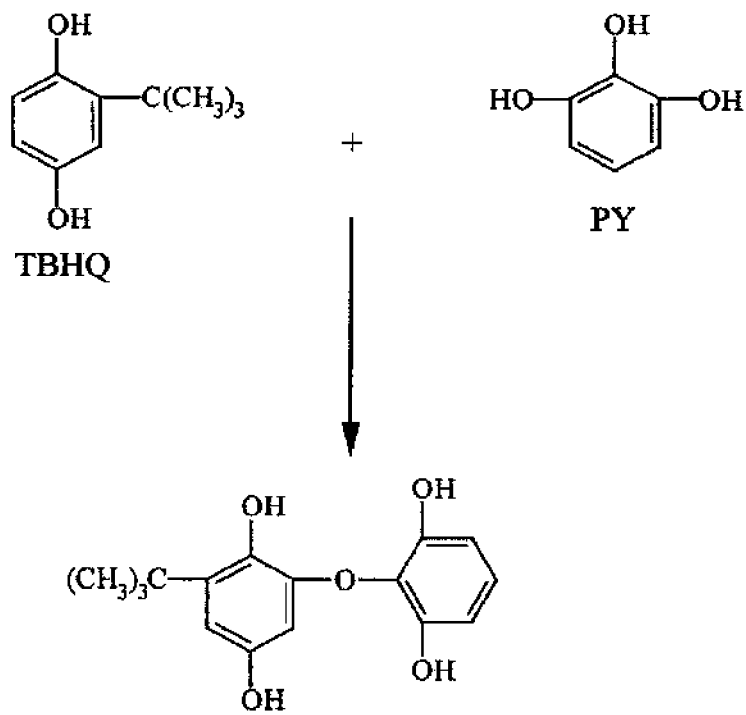

From our results of antioxidant blending, the best combination was achieved by using TBHQ:PY, and it can be inferred that the degradation product moieties of both the primary antioxidants are effective antioxidants as well. FIG. 10 (b) illustrates the dimerization of these moieties and the production of a new antioxidant species that contain two phenols. The heterodimers are in effect better antioxidants than the parent antioxidants. The synergism is a result of the effect of increase in activity of these resultant heterodimers coupled with the effectiveness of the original antioxidants.

Effect of Antioxidant Concentration

Figure 11:
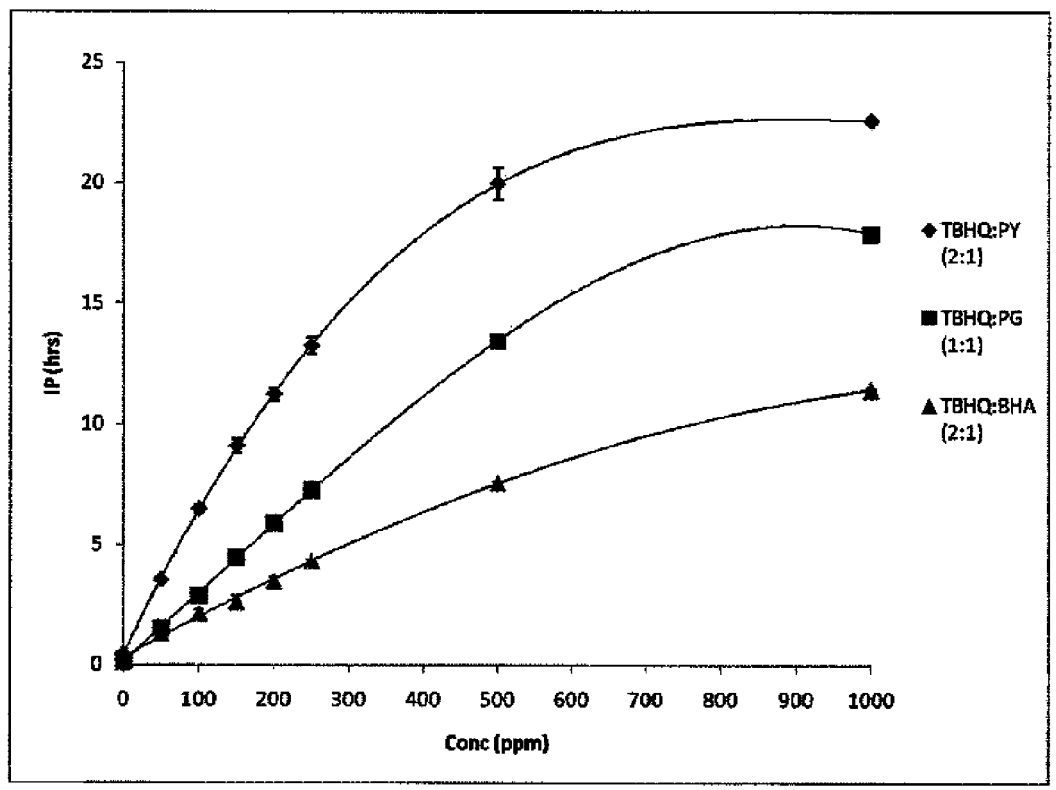
FIG. 11(a) is a graph of the IP values at varying antioxidant blend loadings of 1:1 TBHQ:BHA, 1:1 TBHQ:PG and 2:1 TBHQ:PY in DSBO.
FIG. 11(b) is a graph of the IP values at varying antioxidant blend loadings of 1:1 TBHQ:BHA, 1:1 TBHQ:PG and 2:1 TBHQ:PY in DPF.
Figure 11:
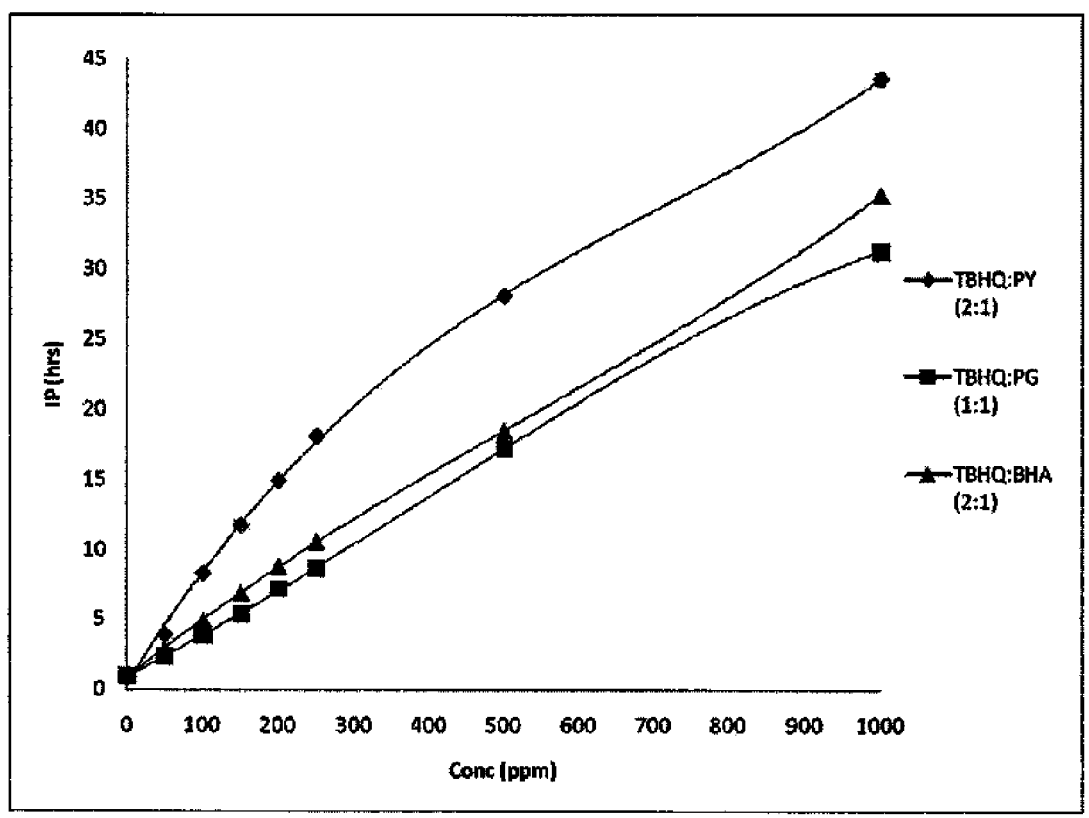

An increase in the IP was observed as antioxidant loading was increased in both DSBO and DPF. For DBSO FIG. 11(a) reflects the nearly linear increase in IP up to 500 ppm, and leveling off from 500 to 1000 ppm. The leveling observation may be attributed to the possible saturation of biodiesel with the antioxidant blend. Another possibility may be related to the dissolution of the solid-phase antioxidants, for both PY and PG. Interestingly, for DPF a more linear concentration effect and greater magnitude were observed (FIG. 11(b)), this shows the increased effect of the antioxidants at lower polyunsaturation to a point of maximized efficiency without saturation.

Figure 12:
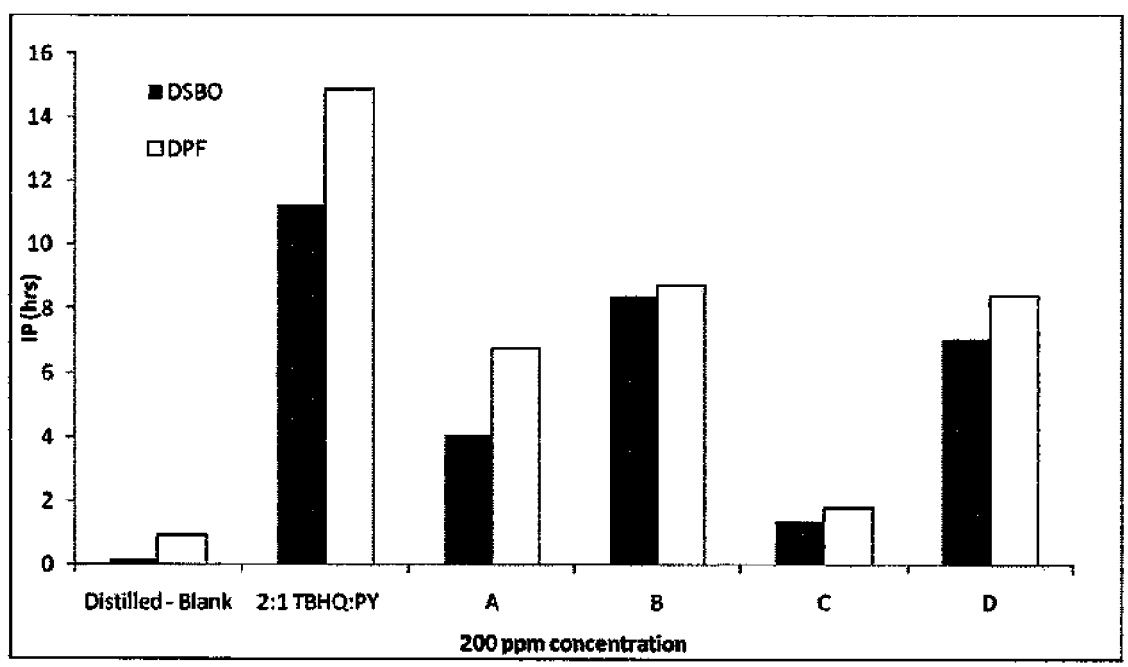
FIG. 12 is a bar graph showing a comparison of the IP values of DSBO- and DPF-based biodiesel utilizing 2:1 TBHQ:PY and four commercial antioxidants (A, B, C and D) at 200 ppm total loading.

Compared with the 4 commercial antioxidants (A, B, C and D) at equal loading of 200 ppm (active ingredient content), the IP with a 2:1 TBHQ:PY formulation in both DSBO and DPF was much higher (FIG. 12). Similarly, all binary formulation in Table 8 produced better IP values as compared to the commercial antioxidants.

The present invention is not to be limited in scope by the specific embodiments disclosed in the examples which are intended as illustrations of a few aspects of the invention and any embodiments which are functionally equivalent are within the scope of this invention. Indeed, various modifications of the invention in addition to those shown and described herein will become apparent to those skilled in the art and are intended to fall within the appended claims.

The present invention is not to be limited in scope by the specific embodiments disclosed in the examples which are intended as illustrations of a few aspects of the invention and any embodiments which are functionally equivalent are within the scope of this invention. Indeed, various modifications of the invention in addition to those shown and described herein will become apparent to those skilled in the art and are intended to fall within the appended claims.

The invention claimed is:

1. A biodiesel fuel comprising an antioxidant additive consisting of a blend of at least 2 phenolic antioxidants without aminic substituents, one of the phenolic antioxidants being tert-butyl hydroquinone, the blend being the only antioxidant additive.

2. The biodiesel fuel of claim 1 wherein the blend is of between 2 and 4 phenolic antioxidants.

3. The biodiesel fuel of claim 1 wherein the at least one antioxidant other than tert-butyl hydroquinone is independently selected from the group consisting of butylated hydroxytoluene, butylated hydroxyanisole, propyl gallate, pyrogallol, 2,5-ditert-butyl-hydroquinone, and α-tocopherol.

4. The biodiesel fuel of claim 1 having at least one improved characteristic selected from the group consisting of:
reduced acid potential as measured by total acid number;
increased induction period; and
increased stability factor;
as compared with the biodiesel fuel absent the blend.

5. The biodiesel fuel of claim 1 wherein the induction period is greater than 3 hours.

6. The biodiesel fuel of claim 5 wherein the induction period is between about 10 hours and about 50 hours.

7. The biodiesel fuel of claim 5 wherein the phenolic antioxidants are selected from the group consisting of butylated hydroxytoluene, butylated hydroxyanisole, propyl gallate, pyrogallol, 2,5-ditert-butyl-hydroquinone and α-tocopherol.

8. The biodiesel fuel of claim 5 wherein the blend of phenolic antioxidants consists of 2 antioxidants and the antioxidant other than the tert-butyl hydroquinone is selected from the group consisting of butylated hydroxytoluene, butylated hydroxyanisole, propyl gallate, pyrogallol, α-tocopherol and 2,5-ditert-butyl-hydroquinone.

9. The biodiesel fuel of claim 5 wherein the feedstock for the biodiesel fuel is selected from the group consisting of vegetable oils, animal fats and mixtures thereof.

10. The biodiesel fuel of claim 9 wherein the feed stock is selected from the group consisting of soybean oil, cottonseed oil, rapeseed oil, corn oil, palm oil, yellow grease, poultry fat, choice white grease and mixtures of any mixture thereof.

11. The biodiesel fuel of claim 7 wherein independently from the other, the concentration of each phenolic antioxidant is from about 20 to about 5,000 ppm.

12. The biodiesel fuel of claim 8 wherein the two phenolic antioxidants are in a weight ratio of about 1:1, about 1:2, about 1:3, about 1:4, about 1:5, about 1:6, about 1:7, about 1:8, or about 9:1.

13. The biodiesel fuel of claim 12 wherein independently from the other, the concentration of each phenolic antioxidant is from about 20 ppm to about 5,000 ppm.

14. The biodiesel fuel of claim 13 wherein independently from the other, the concentration of each phenolic antioxidant is from about 500 ppm to about 1000 ppm.

15. A biodiesel fuel comprising an antioxidant additive consisting of a blend of two phenolic antioxidants wherein the two antioxidants are:
tert-butyl hydroquinone and pyrogallol;
tert-butyl hydroquinone and propyl gallate; or
tert-butyl hydroquinone and butylated hydroxyl anisole,
the blend being the only antioxidant additive.

16. The biodiesel fuel of claim 15 wherein independently from the other, the concentration of each of the two antioxidants is from about 20 ppm to about 10,000 ppm.

17. The biodiesel fuel of claim 16 wherein independently from the other, the concentration of each phenolic antioxidant is from about 500 ppm to about 1000 ppm.

18. The biodiesel fuel of claim 15 wherein the concentration of the blend of phenolic antioxidants is about 1000 ppm.

19. The biodiesel fuel of claim 15 wherein the two phenolic antioxidants are tert-butyl hydroquinone and pyrogallol, wherein the ratio of tert-butyl hydroquinone to pyrogallol is about 2:1.

20. The biodiesel fuel of claim 15 wherein the two phenolic antioxidants are tert-butyl hydroquinone and pyrogallol where the concentration of the tert-butyl hydroquinone is about 700 ppm and the concentration of pyrogallol is about 300 ppm.

21. A biodiesel fuel including a blend of at least 2 non-amine phenolic antioxidants, the at least one antioxidant other than tert-butyl hydroquinone being independently selected from the group consisting of butylated hydroxytoluene, butylated hydroxyanisole, propyl gallate, pyrogallol, and 2,5-di-tert-butyl-hydroquinone.

22. A biodiesel fuel comprising a blend of at least 2 phenolic antioxidants, at least one of the antioxidants is tert-butyl hydroquinone and the other antioxidant being independently selected from the group consisting of butylated hydroxytoluene, butylated hydroxyanisole, propyl gallate, pyrogallol, 2,5-ditert-butyl-hydroquinone, and α-tocopherol.

* * * * *

UNITED STATES PATENT AND TRADEMARK OFFICE
CERTIFICATE OF CORRECTION

PATENT NO. : 8,657,890 B2  Page 1 of 1
APPLICATION NO. : 12/919928
DATED : February 25, 2014
INVENTOR(S) : Ng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 417 days.

Signed and Sealed this

Twenty-ninth Day of September, 2015

Michelle K. Lee
*Director of the United States Patent and Trademark Office*